United States Patent

Rink et al.

[11] Patent Number: 5,803,492
[45] Date of Patent: Sep. 8, 1998

[54] FUEL CONTAINMENT FOR FLUID FUELED AIRBAG INFLATORS

[75] Inventors: Karl K. Rink, Liberty; Bradley W. Smith, Ogden; David J. Green, Brigham City; Michael J. Ravenberg, Corinne; Walter A. Moore, Ogden; L. John Pierotti, Huntsville; Gregory J. Lang; Harry W. Miller, both of Ogden, all of Utah

[73] Assignee: Morton International, Inc., Chicago, Ill.

[21] Appl. No.: 723,796

[22] Filed: Sep. 30, 1996

Related U.S. Application Data

[63] Continuation of Ser. No. 572,452, Dec. 14, 1995, abandoned, and a continuation-in-part of Ser. No. 437,911, May 10, 1995, abandoned, which is a continuation-in-part of Ser. No. 339,603, Nov. 15, 1994, Pat. No. 5,531,473, which is a continuation-in-part of Ser. No. 252,036, May 31, 1994, Pat. No. 5,470,104.

[51] Int. Cl.$^6$ .................................................. B60R 21/26
[52] U.S. Cl. .............................. 280/737; 280/741; 222/3
[58] Field of Search ..................... 280/736, 737, 280/740, 741, 742; 137/68.13, 68.19, 68.23, 68.25; 222/3, 5; 102/530, 531

[56] References Cited

U.S. PATENT DOCUMENTS

| | | | |
|---|---|---|---|
| 2,960,031 | 11/1960 | Clift | 102/40 |
| 2,995,987 | 8/1961 | Fitzpatrick | 89/7 |
| 3,450,414 | 6/1969 | Kobori | 280/736 |
| 3,618,974 | 11/1971 | Chute | 280/150 AB |
| 3,689,105 | 9/1972 | Matsui et al. | 280/150 AB |
| 3,767,228 | 10/1973 | Lewis | 280/150 AB |
| 3,781,788 | 12/1973 | Schiesterl et al. | 340/59 |
| 3,817,263 | 6/1974 | Bendler et al. | 137/68.1 |
| 3,822,895 | 7/1974 | Ochiai | 280/150 AB |
| 3,901,530 | 8/1975 | Radke | 280/150 AB |
| 3,902,425 | 9/1975 | Kurtzemann | 102/90 |
| 3,966,224 | 6/1976 | Campbell et al. | 280/735 |
| 4,104,092 | 8/1978 | Mullay | 149/2 |
| 4,243,248 | 1/1981 | Scholz et al. | 280/735 |
| 4,246,051 | 1/1981 | Garner et al. | 149/7 |
| 4,341,651 | 7/1982 | Beckert et al. | 252/188.25 |
| 4,561,675 | 12/1985 | Adams et al. | 280/734 |
| 4,620,721 | 11/1986 | Scholz et al. | 280/735 |
| 4,984,651 | 1/1991 | Grosch et al. | 180/268 |
| 5,016,914 | 5/1991 | Faigle et al. | 280/741 |
| 5,022,674 | 6/1991 | Frantom et al. | 280/741 |
| 5,060,973 | 10/1991 | Giovanetti | 280/736 |
| 5,071,160 | 12/1991 | White et al. | 280/735 |
| 5,074,583 | 12/1991 | Fujita et al. | 280/735 |
| 5,196,669 | 3/1993 | Richardson | 219/117.1 |
| 5,225,643 | 7/1993 | Marchant | 200/834 |
| 5,232,243 | 8/1993 | Blackburn et al. | 280/732 |
| 5,263,740 | 11/1993 | Frey et al. | 280/737 |
| 5,290,060 | 3/1994 | Smith | 280/737 |
| 5,296,659 | 3/1994 | Potts et al. | 200/83 J |
| 5,301,979 | 4/1994 | Allard | 280/737 |
| 5,330,730 | 7/1994 | Brede et al. | 422/305 |
| 5,344,186 | 9/1994 | Bergerson et al. | 280/741 |
| 5,346,249 | 9/1994 | Hallard et al. | 280/728.3 |

(List continued on next page.)

FOREIGN PATENT DOCUMENTS

| | | |
|---|---|---|
| 0540013 | 5/1993 | European Pat. Off. . |
| 0604001 | 6/1994 | European Pat. Off. . |
| 2112006 | 8/1977 | Germany . |
| 4135547 | 4/1993 | Germany . |
| 4135776 | 5/1993 | Germany . |
| 2270742 | 3/1994 | United Kingdom . |
| 2281225 | 3/1995 | United Kingdom . |

*Primary Examiner*—Peter C. English
*Attorney, Agent, or Firm*—Speckman Pauley Petersen & Fejer

[57] ABSTRACT

Apparatus for inflating an inflatable device, methods for inflating an inflatable safety device and a method of manufacturing an apparatus for inflating an inflatable device are provided having a fuel containment assembly to contain a fuel in the form of a fluid. The fuel, upon proper initiation, is burned to produce gas used in the inflation of the inflatable device.

65 Claims, 9 Drawing Sheets

U.S. PATENT DOCUMENTS

| | | | |
|---|---|---|---|
| 5,348,344 | 9/1994 | Blumenthal et al. | 280/737 |
| 5,350,192 | 9/1994 | Blumenthal | 280/737 |
| 5,356,176 | 10/1994 | Wells | 280/737 |
| 5,360,232 | 11/1994 | Lowe et al. | 280/741 |
| 5,364,127 | 11/1994 | Cuevas | 280/741 |
| 5,407,226 | 4/1995 | Lauritzen et al. | 280/728.1 |
| 5,411,289 | 5/1995 | Smith et al. | 280/735 |
| 5,441,302 | 8/1995 | Johnson et al. | 280/736 |
| 5,470,104 | 11/1995 | Smith et al. | 280/737 |
| 5,494,312 | 2/1996 | Rink | 280/737 |
| 5,531,473 | 7/1996 | Rink et al. | 280/737 |
| 5,577,769 | 11/1996 | Di Giacomo et al. | 280/737 |

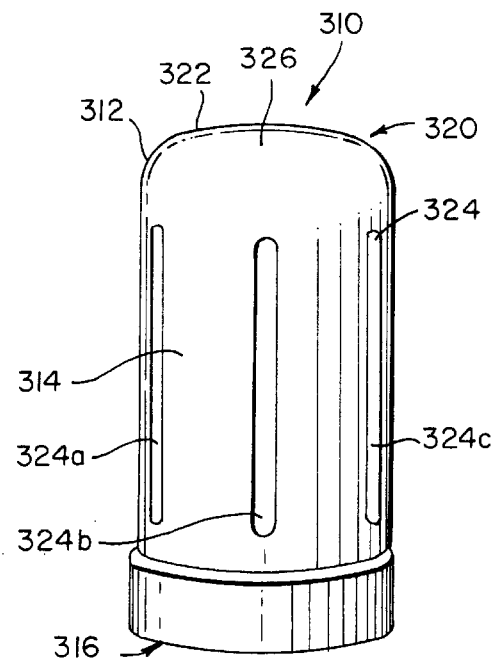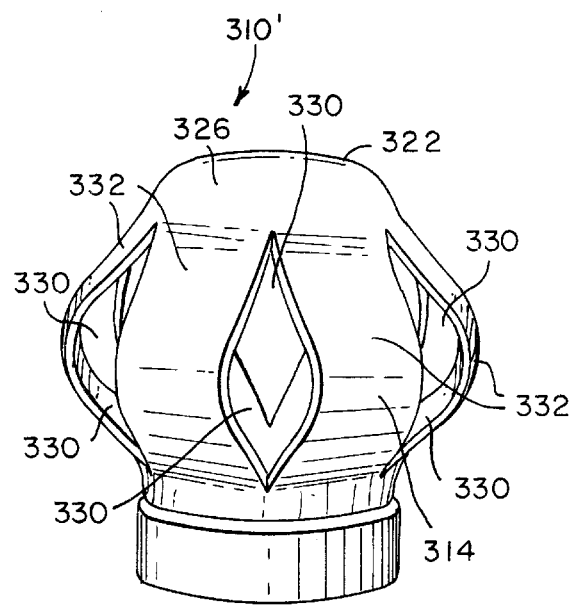
FIG. 8A  FIG. 8B
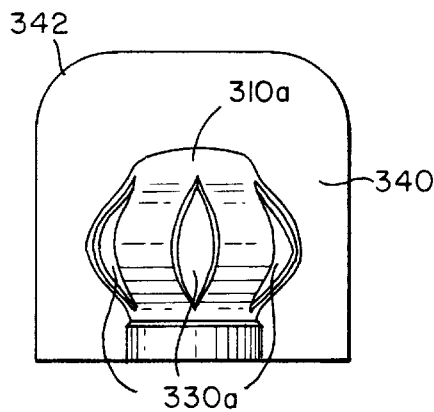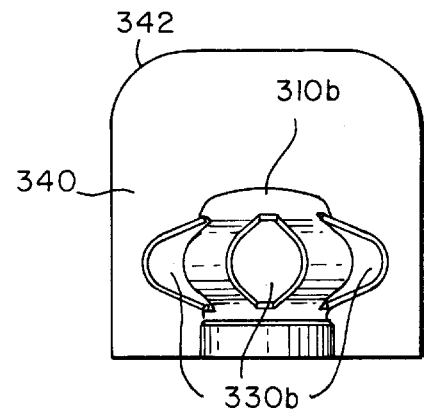
FIG. 9A  FIG. 9B
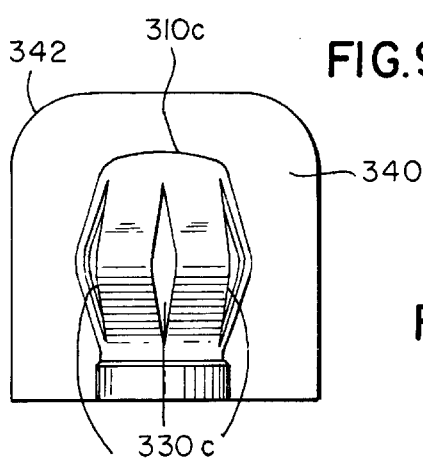
FIG. 9C

FUEL CONTAINMENT FOR FLUID FUELED AIRBAG INFLATORS

This is a continuation of application Ser. No. 08/572,452 filed on 14 Dec. 1995, abandoned, a continuation-in-part of application, U.S. Ser. No. 08/437,911, filed on May 10, 1995, now abandoned, which in turn is a continuation-in-part of application, U.S. Ser. No. 08/339,603, filed on Nov. 15, 1994, now U.S. Pat. No. 5,531,473, issued Jul. 2, 1996 which in turn is a continuation-in-part of application, U.S. Ser. No. 08/252,036, filed on May 31, 1994, now U.S. Pat. No. 5,470,104, issued Nov. 28, 1995.

BACKGROUND OF THE INVENTION

This invention relates generally to inflatable restraint systems such as are used to provide protection to vehicle occupants and, more particularly, to inflator devices such as used in such systems.

It is well known to protect a vehicle occupant using a cushion or bag that is inflated or expanded with gas when the vehicle encounters sudden deceleration, such as in a collision. Such a cushion or bag is commonly referred to as an "airbag."

In such systems, the airbag is normally housed in an uninflated and folded condition to minimize space requirements. Upon actuation of the system, the airbag is commonly inflated in a matter of a few milliseconds with gas produced or supplied by a device commonly referred to as "an inflator."

Many types of inflator devices have been disclosed in the art for inflating an airbag for use in inflatable restraint systems. Prior art inflator devices include compressed stored gas inflators, pyrotechnic inflators and hybrid inflators. Unfortunately, each of these types of an inflator device is subject to certain disadvantages.

For example, stored gas inflators typically require the storage of a relatively large volume of gas at relatively high pressures. As a result of such high storage pressures, the walls of the gas storage chamber are typically relatively thick for increased strength. The combination of large volume and thick walls results in a relatively heavy and bulky inflator design.

With respect to pyrotechnic inflators wherein gas is derived from a combustible gas generating material, i.e., a pyrotechnic, such gas generating materials can typically produce various undesirable combustion products, including various solid particulate materials. The removal of such solid particulate material, such as by the incorporation of various filtering devices within or about the inflator, undesirably increases inflator design and processing complexity and can increase the costs associated therewith. In addition, the temperature of the gaseous emission from such inflator devices can typically vary between about 500° F. (260° C.) and 1200° F. (649° C.), dependent upon numerous interrelated factors including the desired level of inflator performance, as well as the type and amount of gas generant material used therein, for example. Consequently, airbags used in conjunction with such inflator devices typically are specifically constructed of or coated with a material resistant to such high temperatures. For example, in order to resist burn-through as a result of exposure to such high temperatures, an airbag such as constructed of nylon fabric can be prepared such that the nylon fabric airbag material is coated with neoprene or one or more neoprene coated nylon patches are placed at the locations of the airbag at which the hot gas initially impinges. As will be appreciated, such specially fabricated or prepared airbags typically are more costly to manufacture and produce.

Hybrid inflators wherein airbag inflating gas results from a combination of stored compressed gas and combustion of a gas generating material, e.g., a pyrotechnic, also typically result in a gas having a relatively high particulate content.

A new type of inflator device which utilizes a fuel material in the form of a fluid, e.g., in the form of a gas, liquid, finely divided solid, or one or more combinations thereof, has been developed. For example, in one such inflator device, the fluid fuel is burned to produce gas which contacts a quantity of stored pressurized gas to produce inflation gas for use in inflating the respective inflatable device.

While such type of inflator can successfully overcome, at least in part, some of the problems associated with the above-identified prior types of inflator devices, improvements in the design, operation and performance of such inflators as well as improvements in the handling, storage and transport of the fuel material are continually sought in the competitive marketplace to increase manufacturing and production freedom and flexibility without unduly detrimentally impacting the costs associated with such manufacture and production.

SUMMARY OF THE INVENTION

A general object of the invention is to provide an improved fluid fueled inflator and improved fluid fuel containment for airbag inflators.

A more specific objective of the invention is to overcome one or more of the problems described above.

The general object of the invention can be attained, at least in part, through a particular apparatus for inflating an inflatable device described herein. The apparatus includes a first chamber wherein at least one fuel in the form of a fluid is burned to produce combustion products. The apparatus also includes a fuel containment assembly which, in a first embodiment, includes a capsule having an outer wall and defining an enclosed fuel storage volume. The enclosed fuel storage volume is adapted to contain at least a supply of the at least one fuel in the form of a fluid prior to installation of the capsule in the apparatus. The capsule is adapted to open at predetermined operating conditions to be in fluid communication with the first chamber. The apparatus additionally includes an initiator to initiate burning of the at least one fuel in the first chamber.

The invention also comprehends an embodiment wherein the fuel containment assembly includes a closed housing having an outer wall. The housing is adapted to contain a supply of the at least one fuel in the form of a fluid with the outer wall impervious to the at least one fuel. The housing is adapted to open at predetermined operating conditions to be in fluid communication with the first chamber. The housing also has, along a second wall, an initiator to initiate burning of the at least one fuel in the first chamber.

The prior art fails to provide an inflator assembly which utilizes a fuel in the form of a fluid that is burned to produce inflation gas and which assembly can easily and effectively moderate the impact of operation at varying ambient temperature conditions. Further, the prior art fails to provide such an inflator assembly having as greatly as desired moderation or control of the rate at which the fuel is introduced into the combustion chamber and, in turn, as greatly as desired moderation or control of the rate of reaction of such fuel.

The invention further comprehends an inflation apparatus which includes a closed fuel containment assembly wherein a fuel in the form of a fluid is stored. The apparatus additionally includes first and second chambers and an initiator.

Specifically, in one embodiment, the fuel containment assembly includes a capsule having an outer wall and defines an enclosed storage volume. The storage volume is adapted to contain, prior to installation of the capsule in the apparatus, contents including at least a supply of at least one fuel in the form of a fluid. The fuel containment assembly is adapted to open at predetermined operating conditions.

Upon opening of the fuel containment assembly, the first chamber is in fluid communication with at least a portion of the supply of the at least one fuel from the capsule. In the first chamber, the at least one fuel is burned to produce combustion products including hot combustion gas. The initiator initiates the burning of at least a portion of the at least one fuel in the first chamber. The combustion of the at least one fuel increases the temperature and pressure within the first chamber. The first chamber is adapted to open when a predetermined increase in pressure within the first chamber is realized, whereby at least a portion of the hot combustion gas is expelled therefrom.

The second chamber contains a supply of pressurized stored gas. Upon the opening of the first chamber, the second chamber is in fluid communication with the first chamber with the hot combustion gas expelled from the first chamber mixing with the pressurized stored gas to produce inflation gas. The second chamber is adapted to open when a predetermined increase in pressure within the chamber is realized after the hot combustion gas expelled from the first chamber mixes with the pressurized stored gas to produce the inflation gas, whereby at least a portion of the inflation gas is expelled from the second chamber to inflate the device.

In another such inflator apparatus embodiment, the fuel containment assembly includes a closed housing having an outer wall. The assembly and specifically the housing is adapted to contain contents including a supply of at least one fuel in the form of a fluid. The outer wall of the housing is impervious to the at least one fuel and is adapted to open at predetermined operating conditions.

Upon opening of the housing outer wall, the first chamber is in fluid communication with the fuel containment assembly. In the first chamber, at least a portion of the supply of the at least one fuel is burned to produce combustion products including hot combustion gas. This combustion of the at least one fuel is initiated by the initiator and increases the temperature and pressure within the first chamber. The first chamber is adapted to open when a predetermined increase in pressure within the first chamber is realized, whereby at least a portion of the hot combustion gas is expelled therefrom.

The second chamber contains a supply of pressurized stored gas. Upon the opening of the first chamber, the first and second chambers are in fluid communication with each other, with the hot combustion gas expelled from the first chamber mixing with the pressurized stored gas to produce inflation gas. The second chamber is adapted to open when a predetermined increase in pressure within the second chamber is realized after the hot combustion gas expelled from the first chamber mixes with the pressurized stored gas to produce the inflation gas, whereby at least a portion of the inflation gas is expelled from the second chamber.

The invention still further comprehends a method for inflating an inflatable safety device in a vehicle using an inflation apparatus. The method includes the steps of opening either: a) a closed capsule containing, prior to installation in the apparatus, at least a supply of at least one fuel in the form of a fluid, or b) a closed fuel housing of a fuel containment assembly, the housing containing at least a supply of at least one fuel in the form of a fluid prior to the opening. Either such opening results in a release of at least a portion of the supply of the at least one fuel into a first sealed chamber.

The method then proceeds with the step of burning the released portion of the supply of the at least one fuel in the first sealed chamber to produce combustion products including hot combustion gas. This step is then followed by, releasing inflation gas including at least a portion of the combustion gas from the apparatus to inflate the inflatable safety device.

The invention still further comprehends a method of manufacturing an apparatus for inflating an inflatable device. This method includes the step of at least partially filling a capsule, having a closed outer wall which defines an enclosed storage volume, with a supply of least one fuel in the form of a fluid. Thereafter, the fuel-containing capsule is loaded into an apparatus subcombination. The apparatus subcombination includes a first chamber in fluid communication with the fuel-containing capsule upon opening of the capsule, wherein the at least one fuel is burned to produce combustion products. The apparatus subcombination additionally includes an initiator to initiate burning of at least a portion of the supply of the at least one fuel in the first chamber.

As used herein, references to a chamber or volume as being "free of combustion oxidant" are to be understood to refer to a chamber or volume sufficiently free of oxidant such that, over the range of pressures and temperatures experienced during the storage of the fluid fuel therein, the amount of heat liberated by chemical reaction (since the chemical reaction rate is non-zero for all temperatures) is less than the amount of heat dissipated to the surroundings. It will be appreciated that as the rate of such chemical reaction (and hence the amount of heat liberated upon reaction) is dependent on the concentration of oxidant as well as the temperature, the amount of heat liberated can be minimized through proper control of the quantity of oxidant initially present therein.

The term "equivalence ratio" ($\phi$) is commonly used in reference to combustion processes. Equivalence ratio is defined as the ratio of the actual fuel to oxidant ratio $(F/O)_A$ divided by the stoichiometric fuel to oxidant ratio $(F/O)_s$:

$$\phi = (F/O)_A / (F/O)_s$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.) In general, for given temperature and pressure conditions, fuel and oxidant mixtures are flammable over only a specific range of equivalence ratios.

Other objects and advantages will be apparent to those skilled in the art from the following detailed description taken in conjunction with the appended claims and drawings.

BRIEF DESCRIPTION OF THE DRAWINGS

FIGS. 8A and 8B are simplified perspective views of a fuel containment assembly housing in accordance with one embodiment of the invention before and after opening, respectively.

FIGS. 9A, 9B and 9C show the fuel containment housing of FIG. 8A housed within a combustion chamber portion of a fluid fueled inflator assembly after opening at various selected ambient temperature operating conditions.

DETAILED DESCRIPTION OF THE INVENTION

Figure 1:
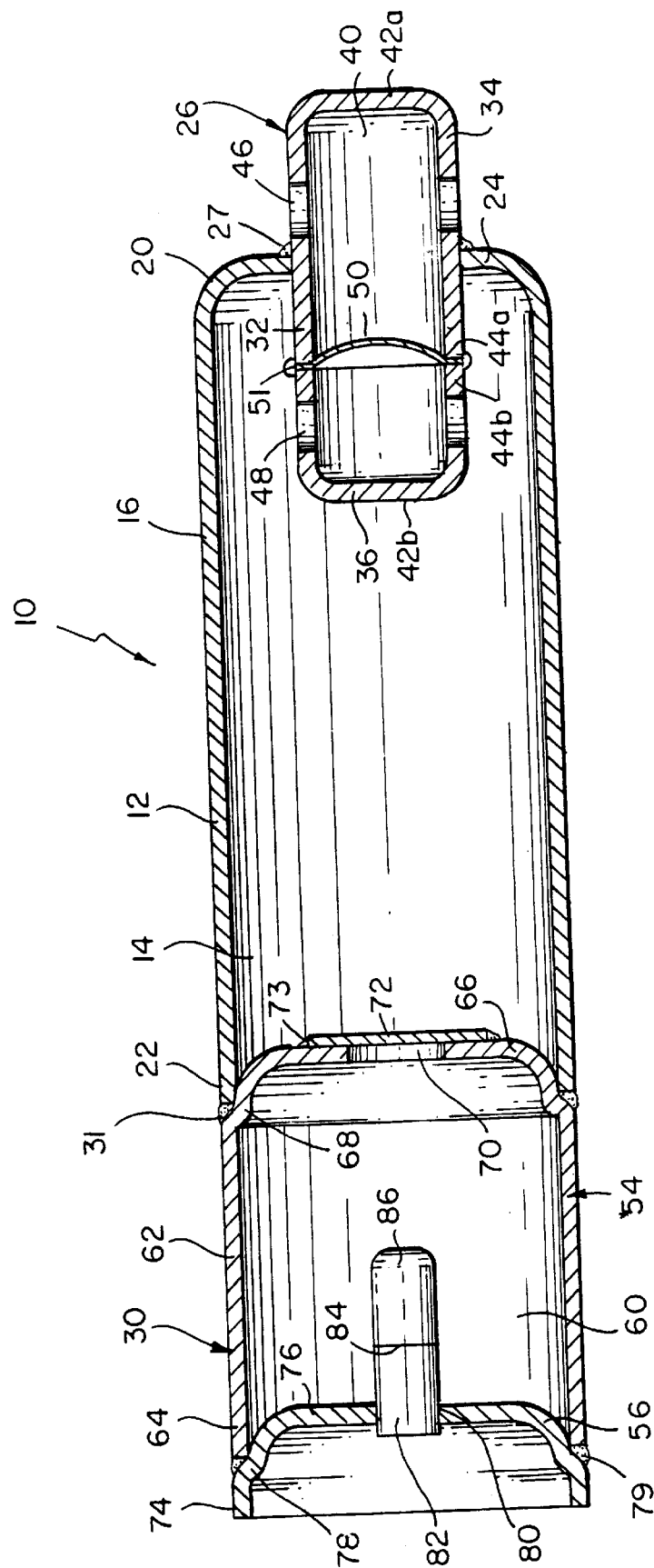
FIG. 1 is a simplified, partially in section schematic drawing of a fluid fueled inflator in accordance with a first embodiment of the invention.

Referring initially to FIG. 1, there is illustrated a fluid fueled inflator assembly 10 for inflating a vehicle occupant restraint, such as an airbag. It will be understood that the invention described hereinafter has general applicability to various types or kinds of airbag assemblies including driver side, passenger side, and side impact airbag assemblies for automotive vehicles including vans, pick-up trucks, and automobiles.

The inflator assembly 10 comprises a pressure vessel 12 including a storage chamber 14 that is filled and pressurized with an inert gas such as argon or nitrogen to a pressure typically in the range of 2000–5000 psi.

The chamber 14 is defined by an elongated generally cylindrical sleeve 16, having a first and a second end, 20 and 22, respectively. The first end 20 is partially closed by means of an integral shoulder portion 24. A diffuser assembly 26 is attached by a circumferential weld 27 in sealing relation to the sleeve first end 20. A combustion chamber assembly 30 is attached by a circumferential weld 31 in sealing relation to the sleeve second end 22.

The diffuser assembly 26 comprises a generally cylindrical sleeve 32 having a cap portion 34 and a base portion 36 to define a diffuser chamber 40. Each of the diffuser assembly cap and base portions, 34 and 36, respectively, include a closed first end 42a and 42b, respectively, and an open second end 44a and 44b, respectively. The diffuser assembly cap portion 34 includes a plurality of openings 46, adjacent the closed cap first end 42a, for dispensing inflation gas from the inflator assembly into an airbag assembly (not shown). The diffuser assembly base portion 36 additionally includes a plurality of openings 48, adjacent the closed base first end 42b, for passage of inflation gas from the storage chamber 14, into the diffuser chamber 40.

The diffuser assembly cap and base portions, 34 and 36, respectively, are aligned with the open second end of each, i.e., ends 44a and 44b, respectively, being closed by sealing means, e.g., by means of a rupture disc 50 abutting thereagainst. The diffuser assembly rupture disc 50 is joined in sealing relation with the diffuser assembly cap and base portions, 34 and 36, respectively, by means of a circumferential weld 51 at the periphery of the disc 50. In the static state, the disc 50 serves to separate the contents of the storage chamber 14 from the airbag.

The combustion chamber assembly 30 comprises a cap portion 54 and a base portion 56 to define a combustion chamber 60. The combustion chamber cap portion 54 includes a sleeve 62, constituting a side wall 64 with a dome 66 joined thereto via a cap shoulder connecting portion 68. The combustion chamber dome 66 includes an orifice, referred to herein as a gas exit opening 70. The gas exit opening 70 is normally closed by sealing means, e.g. by means of a rupture disc 72 joined in sealing relation with the combustion chamber dome 66 by means of a circumferential weld 73 at the periphery of the disc 72.

The combustion chamber dome 66 is generally designed to withstand the internal pressures generated upon the combustion of the flammable mixture, such as described below, within the combustion chamber 60. In the static state, the disc serves in maintaining the gas storage chamber 14 in a sealed condition.

The combustion chamber base portion 56 includes a base ring 74 with a base cap 76 joined thereto via a base shoulder connecting portion 78. The base shoulder connecting portion 78 serves as a convenient means of locating the combustion chamber base portion 56 relative to the combustion chamber sleeve 62, as well as providing a location for a circumferential weld 79 whereby the combustion chamber assembly base portion 56 is attached in sealing relation to the combustion chamber cap portion 54.

The base cap 76 includes an opening 80 therein, wherethrough an initiator device 82, such as described in greater detail below, is attached in sealing relation, such as with a weld, crimping or other suitable hermetic seal, within the combustion chamber 60. The initiator device 82 includes a discharge end 84. A fuel containment assembly 86 in accordance with the invention and such as described in greater detail below is located within the combustion chamber 60, adjacent the initiator device discharge end 84. The fuel containment assembly 86 contains or holds contents which include a quantity of at least one fuel material in the form of fluid, as described in greater detail below.

In operation, such as upon the sensing of a collision, an electrical signal is sent to the initiator device 82, such as a conventional pyrotechnic initiator device. Such an initiator device will upon receipt of an appropriate electrical signal ignite and emit energy, such as in the form of a hot, particle-laden discharge, into the fuel containment assembly 86. In turn, the temperature and pressure of the fuel stored within the closed volume of the fuel containment assembly 86 will increase. Upon the exceeding of the structural capability of the assembly 86, e.g., at predetermined operating conditions such as at a selected threshold internal pressure or temperature, the assembly will rupture or otherwise open placing the heated fuel in fluid communication with the combustion chamber 60. In the combustion chamber 60, the oxidant (such as normally stored within the combustion chamber 60 outside of the fuel containment assembly 86 and thus apart from the fuel material or, as described in greater detail below, stored together with the fuel material within the fuel containment assembly 86) and the heated fuel form a flammable mixture which, via initiation by the initiator 82, ignites and burns at an elevated temperature and pressure.

The hot gas produced upon the burning of the flammable mixture results in a rapid pressure rise within the combustion chamber 60. When the gas pressure within the combustion chamber 60 exceeds the structural capability of the rupture disc 72, the disc ruptures or otherwise permits the passage of the hot gas through the gas exit opening 70 and into the storage chamber 14. Wherein, the hot combustion gas expelled from the combustion chamber 60 mixes with the pressurized gas stored within the separate storage chamber 14 to produce inflation gas for use in inflating the inflatable restraint device, e.g., an airbag. It will be appreciated that augmenting the combustion gas with the stored inert gas produces an inflation gas having both a lower temperature and reduced byproduct concentration (e.g., CO, $NO_x$, $H_2O$, etc.) than the combustion gas alone.

When the gas pressure within the storage chamber 14 exceeds the structural capability of the rupture disc 50, the disc ruptures or otherwise permits the passage of the inflation gas through the diffuser base portion 36 and into the diffuser cap portion 34 and thus allows this inflation gas to vent through the openings 46 into the airbag assembly.

The fluid fuels useable in such an apparatus include a wide range of gases, vapors, finely divided solids and liquids such that, when used with one or more suitable oxidants in proper proportion(s) at selected conditions (either alone or in conjunction with one or more inert gases) form a flammable mixture.

Such fluid fuels include hydrogen, as well as hydrocarbon-based fuels such as hydrocarbon and hydrocarbon derivative fuels. For example, such hydrocarbon fuels include those constituting napthenic, olefinic and paraffinic hydrocarbon groups, particularly $C_1$–$C_4$ paraffinic hydrocarbon fuels. Suitable fuels that can be used in the practice of the invention include, for example; gasoline, kerosene, and octane. In addition, hydrocarbon derivative fuels such as those constituting various alcohols, ethers, and esters, for example, particularly those containing four or fewer carbon atoms and, in particular, alcohols such as ethyl and propyl alcohol can advantageously be used in the practice of the invention.

In general, the finely divided solid fuels useable in the practice of the invention must be of sufficient energy content and reactivity to heat the volume of stored gas to inflate the inflatable restraint device at the desired rate, without the inflator device being of an undesirable large size. Additionally, the fuel desirably produces no more than acceptable levels of combustion products, such as CO, NO, HCN, or $NH_3$, for example, which are or become toxic at sufficiently high concentrations.

The finely divided solid fuel useable in the practice of the invention can include one or more various powders or dusts such as those of:

a) carbonaceous materials such as coal and coal products (e.g., anthracite, bituminous, sub-bituminous, etc., such as with various volatile contents), charcoal, oil shale dust, and coke;

b) cottons, woods, and peat (such as various cellulosic materials including, for example: cellulose acetate, methylcellulose, ethylcellulose, and cellulose nitrate, as well as wood and paper dusts);

c) food feeds (such as flours, starches and grain dusts);

d) plastics, rubbers, and resins (such as epoxies, polyesters and polyethylenes); and e) metal and metal alloy materials (e.g., aluminum, magnesium, titanium, etc., as powders, grits, and/or shavings, in pure or compound form).

It is to be understood that such fuel can, if desired, be held in combinations with varying contents of liquid, vapor and combinations thereof of water.

Further, it will be appreciated that the finely divided solid fuels useable in the practice of the invention will typically include solid particles of varying size and shape. In general, however, the particle size of such finely divided solid fuel will typically vary in a range between about 5 to 500 microns and preferably in a range of about 10 to 125 microns, with mean particle sizes in the range of 10 to 40 microns. In practice, such sized finely divided solid fuels can desirably result in rapid and complete combustion, reducing or even eliminating the need for filtration of particulate from the corresponding inflator assembly design.

The use of finely divided solid fuels can result in various processing advantages. For example, such solid fuels, at least as compared relative to gaseous or liquid fuels, can simplify handling requirements and facilitate storage within an appropriate fuel storage chamber. Such facilitation in handling can, in turn, result in manufacturing cost reductions.

Such finely divided solid fluid fuels are generally to be distinguished from pyrotechnic materials typically used in airbag inflator devices. In general, such prior pyrotechnic materials, even when used in a powdered or similar form, include an oxidant as a component of the pyrotechnic. In contrast, the finely divided solid fluid fuels of the invention do not include an oxidant as a part of the material itself.

It will be appreciated that the fuel material, particularly fuel materials such as liquid hydrocarbons and liquid hydrocarbon derivatives (e.g., alcohols) may include therewith, in limited proportions, materials such as water that are normally not considered to be fuels. This is particularly true for those fuel materials for which complete water separation is not normally practically realizable. Additionally, the presence of water in minor amounts, e.g., less than about 10 vol %, typically between about 4–8 vol %, can beneficially reduce the possibility of undesired autoignition of the inflator assembly without significantly affecting the low temperature performance of the assembly.

It is also to be appreciated that various fuel materials can, if desired, be used mixed together. This is particularly true for those fuel materials, such as commercial grade butane, for which complete separation is not normally practically realizable. For example, fuel mixtures which have been used include: a) a 200 proof alcohol mix containing about 5–10% methyl alcohol, 0.5–1% methyl isobutyl ketone and the balance constituting ethyl alcohol and b) an alkane mix containing about 90+% (e.g. about 95%) butane, 2–6% (e.g., about 4%) propane and with the balance constituting methane, ethane and other various trace hydrocarbon species. An example of one such fuel material is the denatured ethanol, "ANHYDROL SOLVENT SPECIAL, PM-4083, 200 Proof", sold by Union Carbide Chemicals and Plastics Company Inc. and containing 85.8% ethanol, 13.3% methanol and 0.9% methyl isobutyl ketone.

Further, such fuels can be used in multi-phase combinations of two or more of the fuels in different states (e.g. gas, liquid, and solid). For example, the fluid fuel used can constitute a combination or mixture of a finely divided solid fuel in a liquid fuel, such as a starch in ethyl alcohol, for example. Similarly, the fluid fuel can constitute a combination or mixture of a gaseous fuel held in intimate contact with a liquid fuel. For example, such a gaseous fuel could be held in contact with the liquid fuel under pressure, similar in fashion to a carbonated beverage held in a container.

Oxidants useable in the invention include various oxygen-containing gases including, for example, pure oxygen, air, diluted air, and oxygen combined with one or more gas diluents such as nitrogen, carbon dioxide, and noble gases such as helium, argon, xenon. In practice, the use of pure oxygen ($O_2$) may be disadvantageous for a number of reasons including: 1) from a production viewpoint, such use may present handling difficulties, 2) such use can magnify autoignition difficulties, 3) when combined with the proper amounts of fuel (stoichiometric or near stoichiometric, $0.8 \leq \phi \leq 1.2$), extremely high flame temperatures can result (especially at the elevated pressures commonly associated with such inflator designs), and 4) at equivalence ratios of less than 0.8, excess quantities of oxygen and carbon monoxide can cause concern.

In view thereof, mixtures of argon and oxygen may be preferred. Argon advantageously is relatively: 1) inert, 2) inexpensive, 3) safe, and 4) easy to handle. The preferred relative amounts of the components of such a mixture will in general be dependent on factors such as the inflator geometry and the particular fuels used therein. For example, an oxidant mixture of 50–65 vol % oxygen with the balance being argon can advantageously be used with ethyl alcohol-based fuel-containing assemblies.

It will also be appreciated that such oxidant mixtures can be used in conjunction with minor amounts of air, such as may be initially present in the chamber to be filled with oxidant, prior to the addition of the oxidant therein.

In one preferred embodiment of the invention, the fuel material is stored separate and apart from the combustion oxidant. For example, the fuel is stored within the fuel containment assembly while the oxidant is stored outside of the fuel containment assembly but within the combustion chamber such that the fuel and oxidant are in fluid communication only after the fuel containment assembly has ruptured or otherwise opened.

It is to be appreciated, however, that if desired, the fuel material and oxidant can be stored in contact with each other. In one alternative preferred embodiment, a fuel material and oxidant can be stored together as a single material such as a hydroxyl ammonium nitrate-based liquid monopropellant. Such propellants are disclosed in U.S. Pat. No. 5,060,973, the disclosure of which is herein incorporated.

A particularly suitable liquid propellant composition containing both a fuel material and an oxidant material comprises, by mass, approximately 60% hydroxyl ammonium nitrate as an oxidizer, 20% triethanol ammonium nitrate as a fuel, and 20% water as a solvent.

It is to be appreciated that with a liquid propellant such as an aqueous solution of hydroxyl ammonium nitrate and a nitrated hydrocarbon salt, such as triethanol ammonium nitrate, the exothermically generated gases generally consist of nitrogen, carbon dioxide and water vapor, all of which are generally considered non-toxic. Furthermore, the combustion of such a propellant material generally results in no significant particulate by-product and thus preferably renders as unnecessary the post-combustion filtering of the products of combustion.

Thus, the invention permits the use of a wide range of fuels in a variety of forms (including gaseous, liquid, and solid, as well as mixtures thereof, including multi-phase combinations of two or more fuel materials) and a wide variety of oxidant species, and also a wide range of relative amounts of fuel and oxidant species.

In general, the inflator assemblies of the invention are preferably operated with equivalence ratios in the range of $0.4 \leq \phi \leq 1.6$, preferably in the range of $0.6 \leq \phi \leq 1.1$.

As with the gas stored in the storage chamber 14, storage of gas within the combustion chamber 60 at relatively high pressures advantageously helps minimize the overall size of the inflator as well as minimize ignition delay, thereby resulting in higher and faster performance by the inflator assembly, as well as resulting in more complete combustion, such as through increased temperature and, hence, reaction rates. In addition, such an inflator assembly minimizes emission of incomplete products of combustion.

It will be appreciated that the combustion chamber surrounding the fuel containment assembly of the invention can alternatively contain, as desired or needed, one or more gaseous materials such as air, oxidant or inert gas.

Figure 2:
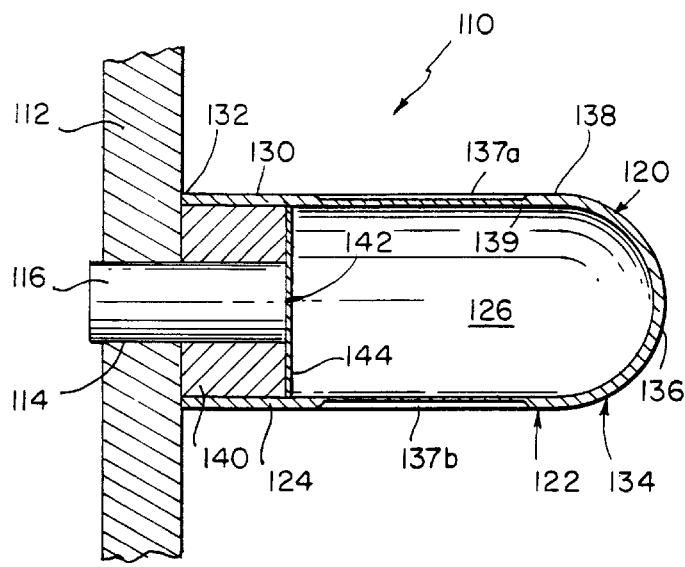
FIG. 2 is a simplified, partially in section fragmentary schematic drawing of the fluid fueled inflator of FIG. 1 having a fuel containment assembly in accordance with one embodiment of the invention.

FIG. 2 illustrates a fragmentary portion of a fluid fueled inflator 110 in accordance with one embodiment of the invention. The illustrated portion of the fluid fueled inflator 110 includes an inflator combustion chamber base cap portion 112 with an opening 114 wherethrough an initiator device 116 is secured or attached and a fuel containment assembly 120.

The fuel containment assembly 120 includes a housing 122 having an outer wall 124. Such a housing can be fabricated from various appropriate selected materials including plastic (such as acetal, chlorinated polyvinyl chloride (CPVC), polyetheretherketone, propylene, and polytetrafluoroethylene, for example), ceramic (such as silicon and alumina-based ceramics, for example) or, more typically, a metal (such as aluminum or a low carbon steel, for example).

The housing 122 is closed in that:

1. the housing defines a closed storage volume 126 wherein, for example, the housing is adapted to contain a supply of at least one fuel in the form of a fluid, as described above, and
2. the outer wall is impervious to the fuel, that is, the material comprising the outer wall is not normally significantly changed, affected or physically altered as a result of contact with or by the fuel.

As described above, in one preferred embodiment, the fuel is preferably stored free of combustion oxidant. However, such as also described above, the fuel and oxidant can, if desired, be stored together therein.

The housing 122 is generally bullet shaped with the outer wall 124 including a generally cylindrical side portion 130 having an open first or base end 132 proximate to the combustion chamber base cap portion opening 114 and a second end 134 which is closed by means of a dome-shaped portion 136.

If desired, and as shown, a selected portion or portions of the assembly 120 can be pre-weakened, such as by the inclusion of external axial score lines 137a and 137b or otherwise have the thickness of the outer wall 124 selectively reduced. It will be appreciated that such inclusion of score lines or the like (e.g., dimples) to selectively reduce the thickness of the outer wall 124 can facilitate opening of the assembly 120 at specific predetermined operating conditions as well as better ensure that the assembly desirably ruptures or opens at predetermined locations and preferably avoids forming undesired fragments upon opening.

Further, it will be appreciated that the scores or other appropriately selected forms of pre-weakening can be machined into the wall surface or molded into the surface such as when the part has been mold fabricated, such as may conveniently be done when the part is fabricated from plastic material.

It will also be appreciated that while the assembly 120 has been shown with external score lines (i.e., score lines on the outer surface 138 of the respective wall 124), if desired, such score lines or the like can be appropriately alternatively or complimentarily located, such as along the inner surface 139 of the outer wall 124, for example.

The open base end 132 is partially closed by means of a housing base 140 and the initiator device 116. It will be appreciated that the housing base can, if desired, include features and seals (not shown) such as O-rings, crimps, flanges, etc. or, alternatively or additionally, a selected means of interference and press fit to facilitate and secure attachment or joinder of the initiator device therein.

As will be appreciated relative to this illustrated embodiment, a fuel material held in such the storage volume 126 normally directly contacts the housing outer wall 124.

The initiator 116 includes a discharge end 142, wherefrom upon actuation, initiation products are discharged. If desired, and as shown, a hermetic seal 144 such as in the form of a disc of metal can be applied about the initiator discharge end 142 to prevent the fluid fuel material from directly contacting the initiator 116. The inclusion of such a seal can assist in avoiding and preventing undesired deterioration or degradation of the initiator such as could result from undesired contact of the initiator by the fuel material as well as better ensure the avoidance of fuel leakage.

In operation, such as upon receipt of an appropriate electrical signal by the associated initiator 116, a discharge of energy such as in the form of a hot, particle-laden discharge is directed therefrom to the fuel containment assembly 120, specifically from the discharge end 142, through the seal 144 and to the fuel material stored within the fuel storage volume 126, whereupon the temperature and pressure of the fuel material will increase. Upon the exceeding of the structural capability of the wall 124, the housing 122 will rupture or otherwise open at or proximate to the scores 137a and 137b, placing the heated fuel in fluid communication with the combustion chamber and the oxidant held therein. Thereafter, operation will generally be similar to that for the above-described embodiment.

Figure 3:
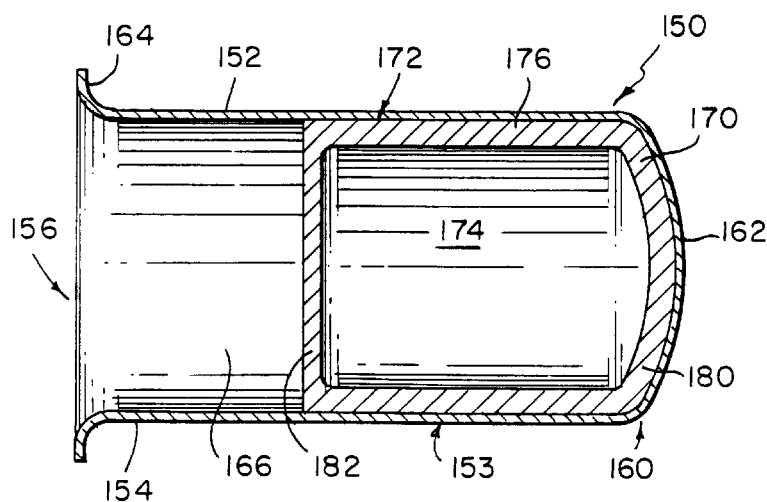
FIG. 3 is a simplified sectional schematic drawing of a fuel containment assembly in accordance with an alternative embodiment of the invention.

FIG. 3 illustrates a fuel containment assembly 150 in accordance with an alternative embodiment of the invention. The fuel containment assembly 150, similar to the fuel containment assembly 120 illustrated in FIG. 2, includes a housing 152 having an outer wall 153 which is generally bullet-shaped and includes a generally cylindrical side outer wall 154 having an open first or base end 156 and a second end 160 which is closed by means of a dome-shaped closed end outer wall 162.

As with the above-described inflator assembly 110, the open first or base end 156 is designed for placement adjacent a corresponding combustion chamber base cap portion opening (not shown). Specifically, the open first or base end 156 includes an outwardly curled lip 164 and defines an initiator placement volume 166 wherein, in a final assembly, an initiator device (not shown) can be placed.

The fuel containment assembly 150 differs, however, differs from that in the above-described embodiment of FIG. 2 in that the fuel material is contained within a capsule device 170, rather being stored in the housing in direct contact with the housing outer wall.

The capsule 170 can be fabricated from a wide range of materials such as metal (such as aluminum, carbon steel and stainless steel) or, preferably, plastic material so as to provide desired strength and resiliency, for example. It is to be appreciated that while the fuel capsules of the invention can, if desired, be fabricated from materials such as ceramic and glass, such materials of fabrication may at least initially find limited applicability due to the propensity of such materials, in operation, to fragment such as a result of brittle fracture.

It is also to be appreciated that the invention, if desired, can be practiced with capsules fabricated of a material, such as certain plastics, which is itself, at least in part and in some cases preferably substantially if not totally, combustible and therefore consumable in the oxidizing environment of the combustion chamber. A capsule made of such consumable material may provide additional energy which can be used in the production of inflation gas as well as avoid the need for the provision of particular capsule features such as particular opening arrangements or ports.

The capsule 170 includes a closed outer wall 172 which defines an enclosed storage volume 174 therein adapted to contain at least a supply of at least one fuel material in the form of a fluid, as described above. Specifically, the closed outer wall 172 includes a generally cylindrical side 176, a domed first end 180 and an initiator adjacent second end 182.

As shown, the capsule 170 is fitted within the housing 152 adjacent the dome-shaped closed end housing outer wall 162.

It is to be understood that as described above, in one preferred embodiment, the fuel is preferably stored free of combustion oxidant. However, it is also to be appreciated that the fuel and oxidant can, if desired, be stored together therein, such as previously described.

In operation, such as upon receipt of an appropriate electrical signal by the associated initiator device, a discharge of energy such as in the form of a hot, particle-laden discharge is directed therefrom to the fuel containment assembly 150, specifically the capsule 170 whereupon the temperature and pressure of the fuel material held within the enclosed storage volume 174 will increase. Upon the exceeding of the structural capability of the capsule wall 172, the capsule 170 will rupture or otherwise open and in turn rupture or otherwise open the housing outer wall 153, placing the heated fuel in fluid communication with the combustion chamber and oxidant held therein. Thereafter, operation will generally be similar to that described above.

Increased or improved moderation or control of the rate at which the fuel is introduced into the combustion chamber and, in turn, increased or improved moderation or control of the rate of reaction of such fuel resulting in gas production are significant benefits resulting from the utilization of a fuel containment assembly in accordance with the invention. Such rate control can be realized through the appropriate selection of various design parameters. For example, the sizing and pyrotechnic loading of the initiator device can be selected to provide the desired degree of fracturing or opening for a given assembly component. Another design parameter which can be appropriately selected is the fracturability of the component which can be varied based on factors such as wall thickness, surface preparation (such as through the inclusion of areas of pre-weakening such as through the inclusion of scores or the like, as well as the depth, location and arrangement of any such areas of pre-weakening) as well as the material of construction for the component. It will be appreciated that the selection, amount and fill fraction of the fuel material are additional design parameters which can be used to desirably affect assembly performance and characteristics.

Thus, the fuel containment assembly of the invention can be designed to appropriately tailor the rate at which the fuel stored therein is introduced into the combustion chamber for reaction and gas production. As a result, such fuel containment assemblies permit greater flexibility in the designing of the corresponding inflators to meet particular processing or operational needs. For example, by moderating the rate at which fuel is introduced into the combustion chamber, combustion chamber conditions which would typically be considered too aggressive or uncontrollable, such as because of too rapid an increase in pressure within the combustion chamber resulting from too great a rate of fuel introduction therein, can desirably be avoided.

Figure 4:
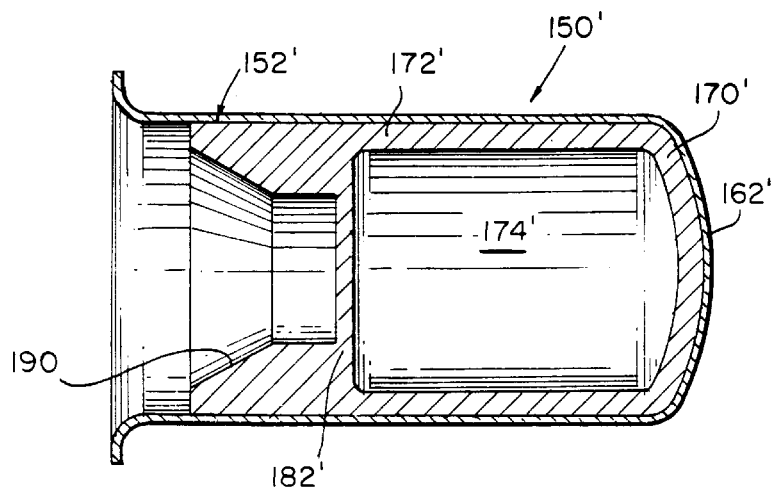
FIG. 4 is a simplified sectional schematic drawing of a fuel containment assembly in accordance with another alternative embodiment of the invention.

FIG. 4 illustrates a fuel containment assembly 150' in accordance with an alternative embodiment of the invention. (As the fuel containment assembly 150" is generally similar to the fuel containment assembly 150 shown in FIG. 3, like parts are designated by the addition of an apostrophe, i.e., "'" to the reference numeral.)

The fuel containment assembly 150' includes a housing 152' and a capsule 170'. As in the above-described embodiment, the capsule 170' includes a closed outer wall 172' which defines an enclosed storage volume 174' therein. As shown, the capsule 170' is fitted within the housing 152' adjacent the dome-shaped closed end housing outer wall 162'.

The capsule 170', however, is adapted to facilitate attachment with and adjacent to an associated initiator device (not shown). Specifically, the capsule outer wall 172' includes an initiator adjacent second end 182' molded to form a profile 190 adapted to correspond to the associated initiator device. As a fuel assembly containment device so formed will in practice desirably position the fuel load generally adjacent the discharge end of the associated initiator device, such a containment device can beneficially facilitate operation of the inflator.

It will be appreciated that other than for placement of the initiator within the assembly, operation will generally be similar to that described above for the assembly 150 of FIG. 3.

As described above, the housing of a fuel containment assembly, if desired and in accordance with the invention, can include areas of pre-weakening such as in the form of scores or the like such as to facilitate opening of the assembly at specific predetermined operating conditions. It will also be appreciated that for those assemblies including a capsule device, the outer wall of the capsule can, if desired, include scores or the like such as to facilitate opening of the capsule. It is thus to be appreciated that in fuel containment assemblies in accordance with the invention and which include both a housing and a capsule:

1. both the capsule and housing can be fabricated to include areas of pre-weakening such as in the form of scores or the like,
2. either the capsule or the housing can be fabricated to include areas of pre-weakening such as in the form of scores or the like, or
3. both the capsule and the housing can be fabricated to not include areas of pre-weakening such as in the form of scores or the like.

Further, in those fuel containment assemblies in accordance with the invention which include only one of either a capsule or a housing component, such component can be fabricated to include or not include areas of pre-weakening such as in the form of scores or the like, as desired.

Figure 5:
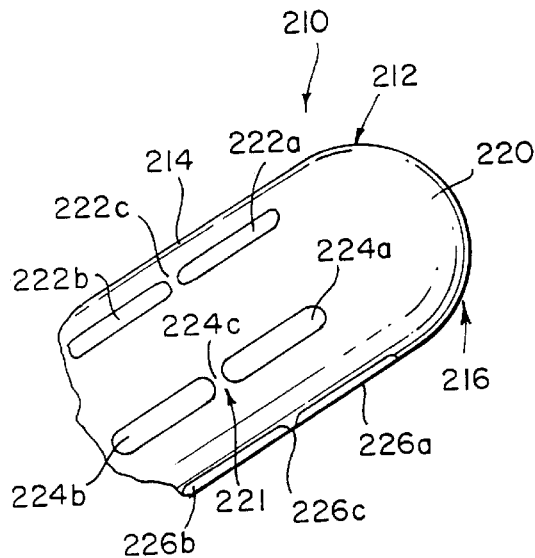
FIG. 5 is a simplified fragmentary perspective view of alternatively either a housing or a capsule component of a fuel containment assembly in accordance with one embodiment of the invention.

FIG. 5 illustrates a fuel containment assembly component 210, i.e., either a housing or a capsule, in accordance with one embodiment of the invention. Specifically, the component 210, similar to those described above includes a generally bullet shaped outer wall 212 having a generally cylindrical side wall portion 214 with an end 216, closed by means of a dome-shaped wall portion 220.

The outer side wall 214 differs from those previously described in that it includes non-continuous axial scores which form an annular ring 221 of non-reduced wall thickness in a region of the component 210 which is subjected to high stress when the component has been properly actuated.

Three sets of such non-continuous scores are shown: 222a and 222b, 224a and 224b, and 226a and 226b. Specifically, the axial line of each such score arrangement is interrupted by a non-scored region, e.g., regions 222c, 224c, and 226c, respectively. These non-scored regions form a part of the annular ring 221. It will be appreciated that the inclusion of such a ring can increase the strength of the component structure such as to strengthen the component in case of application of increased external storage pressures thereagainst.

Figure 6A:
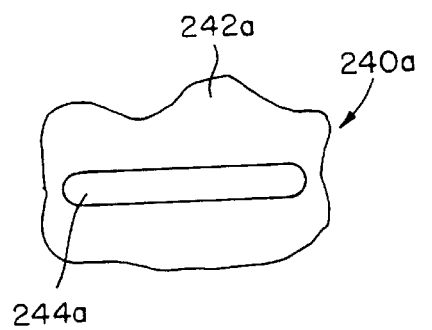
FIGS. 6A, 6B, 6C and 6D are simplified fragmentary views of alternative score arrangements or forms for alternatively either a housing or a capsule component of a fuel containment assembly in accordance with alternative embodiments of the invention.
Figure 6B:
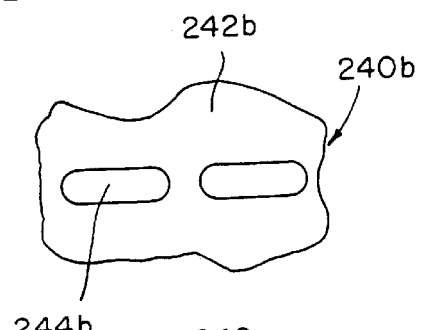

FIGS. 6A, 6B, GC and 6D each illustrate a fuel containment assembly component 240a, 240b, 240c and 240d, i.e., either a housing or a capsule, wherein a portion of the outer side wall 242a, 242b, 242c and 242d includes alternative score arrangements or forms 244a, 244b, 244c and 244d.

More particularly, FIG. 6A illustrates a score arrangement 244a comprising a continuous axially extending score line, similar to that shown in FIG. 2 and described above.

FIG. 6B illustrates a score arrangement 244b comprising a non-continuous axially extending score line, similar to that shown in FIG. 5 and described above.

Figure 6C:
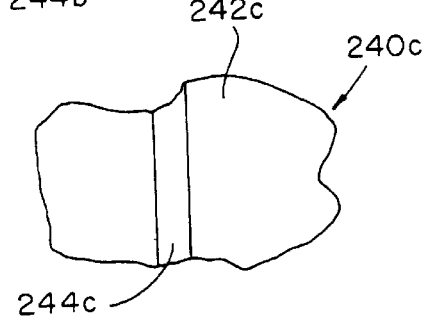

FIG. 6C illustrates a score arrangement 244c comprising a radially extending score line, such as would circumscribe the component 240c about the outer side wall 242c.

Figure 6D:
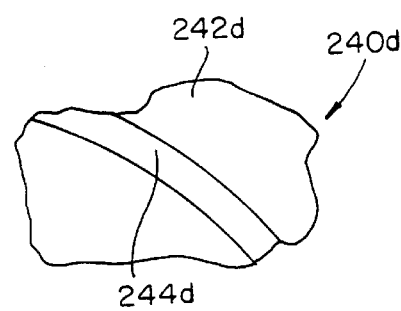

FIG. 6D illustrates a score arrangement 244d comprising a cylindrical helix axially extending score line about the outer side wall 242d.

Additionally, while the invention has been described above relative to possible inclusion of one or more scores, areas of reduced thickness or the like about the outer side wall of one or more fuel containment assembly components (e.g., the housing and/or capsule), it will be appreciated that scores or the like can alternatively or additionally be included elsewhere about the respective fuel containment assembly component, if desired, including about the dome-shaped outer wall portion to facilitate opening thereat.

Figure 7A:
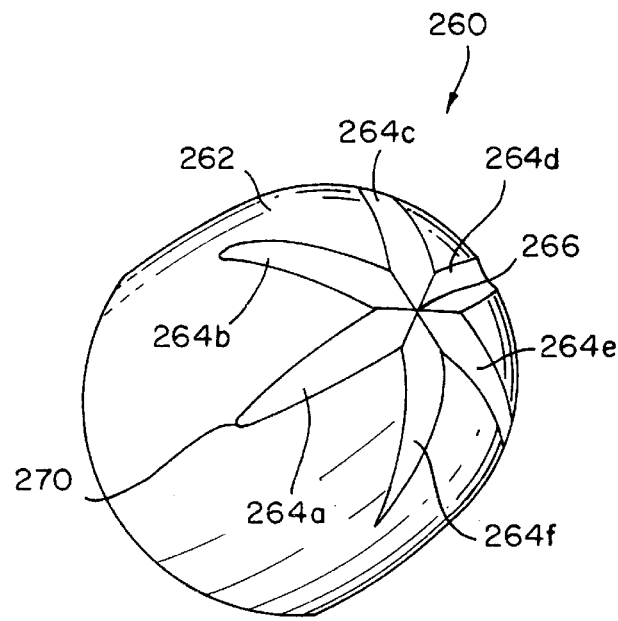
FIGS. 7A and 7B are simplified perspective views of a fuel containment assembly component, i.e., either a housing or a capsule, having a scored dome in accordance with one embodiment of the invention before and after opening, respectively.
Figure 7B:
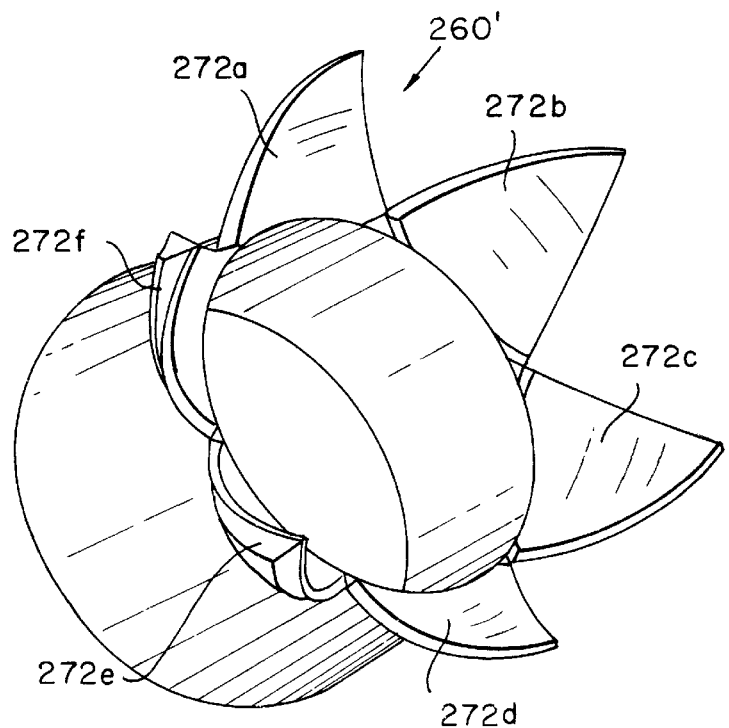

FIG. 7A illustrates a fragmentary portion of a fuel containment assembly component 260, i.e., either a housing or a capsule, before opening, while FIG. 7B illustrates that same fuel containment assembly component, now designated 260', after opening.

The component 260 includes a domed, generally hemispherically-shaped outer wall 262, which has been scored in accordance with one embodiment of the invention. Specifically, the wall 262 includes six (6) score lines or grooves individually designated 264(a–f) which generally extend from the top center 266 of the hemisphere to the tangency point 270 around the edge of the hemispherically-shaped outer wall 262. These grooves 264(a–f) taper, gradually decreasing in depth the further away from the top center 266. It will be appreciated that such a structure and arrangement can be used when discharge of the fuel from the end of the component is desired. For example, such an arrangement can be used when due to component size limitations, such as insufficient side wall area, the component lacks adequate room for the inclusion of scoring along the side walls.

In operation, such as upon receipt of an appropriate electrical signal by the associated initiator device, a discharge of energy such as in the form of a hot, particle-laden discharge is directed therefrom to the fuel containment assembly component 260, whereupon the temperature and pressure of the fuel material held within the component 260 will increase. Upon the exceeding of the structural capability of the component outer wall 262, the wall 262 will open, as shown in FIG. 7B, with the dome-shaped wall forming petals 272(a–f) which petal open to place heated fuel in fluid communication with the combustion chamber and oxidant held therein. Thereafter, operation will generally be similar to that described above.

FIG. 8A illustrates a fuel containment assembly housing 310 in accordance with one embodiment of the invention before opening, while FIG. 8B illustrates that same fuel containment assembly housing, now designated 310', after opening.

The housing 310 is generally similar to the housing 122 shown in FIG. 2 and described above. More specifically, the housing 310 is generally bullet shaped with an outer wall 312 which includes a generally cylindrical side portion 314 having an open first or base end 316 such as would be positioned proximate to the combustion chamber base cap portion opening (not shown) and a second end 320 which is closed by means of a dome-shaped portion 322.

The housing 310 has been selectively pre-weakened by the inclusion of six (6) generally equally spaced, axially extending score lines 324 (e.g., lines whereat the thickness of the outer wall 312, specifically the cylindrical side portion 314 thereof, has been reduced), such as described above. In FIG. 8A, only three of the score lines 324 are visible and have been designated 324a, 324b and 324c, respectively. As shown, the score lines 324 do not extend into the dome-shaped portion 322, resulting in a smooth, unscored dome surface 326.

As shown by the fuel containment housing 310' of FIG. 8B, in operation and upon actuation, the pressure builds up within the housing resulting in rupture or opening of the housing along weakest areas of the outer wall 312, i.e., along the score lines 324 whereat the outer wall is the thinnest. As a result, the pressure build-up which causes the housing to radially swell or bulge outward is preferably exhausted through score line openings 330 formed in the outer wall 312 generally along the score lines 324. After opening, the dome-shaped portion 322 remains joined as a part of the housing 310' by means of bands 332 of the side wall 314, extending between adjacent score line openings 330.

In addition to the above-described benefit of increased or improved moderation or control of the rate at which the fuel is introduced into the combustion chamber, the fuel containment assembly arrangement of the invention can provide beneficial moderation of the influence of ambient temperature on inflator performance. Such moderation of the influence of ambient temperature on inflator performance (also referred to as "self-compensation") is described below with reference to FIGS. 9A, 9B and 9C which show the fuel containment housing, shown in FIG. 8A and described above, herein individually designated 310a, 310b and 310c, respectively, wherein the housing is within a combustion chamber portion 340 of a fluid fueled inflator assembly 342, at various selected ambient temperature operating conditions. It is to be appreciated that the external pressure load on the fuel containment housing 310 will increase significantly as the temperature in the combustion chamber rises.

FIG. 9A shows the housing 310a after opening when the ambient temperature within the combustion chamber is about 21° C. and the pressure within the combustion chamber is about 1850 psi.

FIG. 9B shows the housing 310b after opening when the combustion ambient conditions are generally considered to be "cold", e.g., a temperature of about –40°°C., whereat the pressure within the combustion chamber is about 1595 psi.

FIG. 9C shows the housing 310c after opening when the combustion ambient conditions are generally considered to be "hot", e.g., a temperature of about 90° C., whereat the pressure within the combustion chamber is about 2425 psi.

In each of FIGS. 9A, 9B and 9C, the area provided by the passage score line openings, designated 330a, 330b and 330c, respectively, varies with the particular conditions of operation. As shown, at low ambient temperatures, the housing device is subjected to relatively low external pressure and is comparatively easier to open. At a higher ambient temperature, the device is subject to relatively greater external pressure and would as a result typically be comparatively more difficult to open. Specifically, at a higher ambient temperature (all other factors, such as fuel drop size, equivalence ratio, oxygen concentration, etc. held constant) the pressure within the combustion chamber will be greater and it is hence more difficult for an initiator of a given strength to fully open the housing. Thus, as the ambient temperature and hence pressure increases, the relative amount of passage area provided upon opening of the housing decrease, resulting in a decrease in the rate fuel material passes from the housing into the combustion chamber. Additionally, it is believed that the quality of the degree of atomization is reduced in that the relative size of the fuel drops produced increases. Relatively larger sized drops will require more time to be heated, vaporized and burned. In view of the fuel materials of the invention generally being more reactive at higher temperatures, an inflator assembly having such a fuel containment device can self-compensate for the effect of a typical or normally anticipated change in ambient temperature such as by more quickly releasing fuel when at a lower ambient temperature and, alternatively, more slowly releasing fuel at a higher ambient temperature.

It is to be appreciated that similar effects can also be realized when the fuel containment device is a capsule, such as described herein.

As a result, inflators utilizing fuel containment devices such as described herein can generally desirably experience significantly reduced variability in performance with changes in ambient temperature.

While the invention has been described above with reference to the possible inclusion of score lines or the like in fuel assembly components (such as a housing or a capsule) such as to facilitate assembly opening at specific predetermined operating conditions, it will be appreciated that, if desired, the invention can be practiced with the selective inclusion of one or more strengthening or stiffening features to prevent, avoid or make more difficult opening of the assembly or of selected portions thereof.

Figure 10:
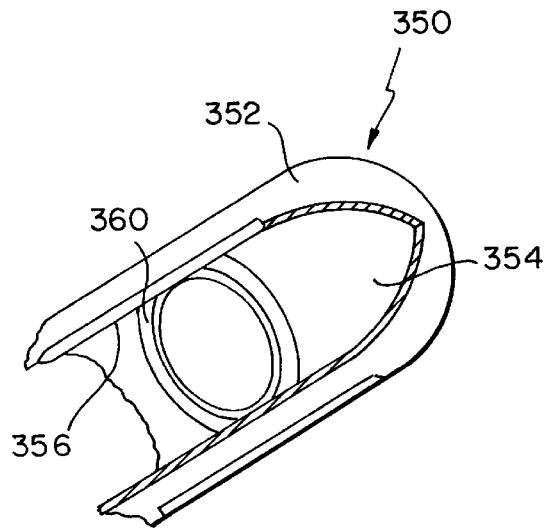
FIG. 10 is a simplified, partial in section, fragmentary perspective view of alternatively either a housing or a capsule component of a fuel containment assembly in accordance with an alternative embodiment of the invention.

For example, FIG. 10 illustrates a fuel assembly component 350, i.e., either a housing or a capsule, with an outer wall 352 having a generally circular cross section and defining an inner volume 354. The component 350 includes within the internal volume 354, adjacent the inner surface 356 of the outer wall 352 a wall support feature 360, shown in the form of a stiffening circular ring or rib. Such inclusion of a wall support feature can generally serve to increase the external load capacity of the component 350, such as to prevent buckling of the outer wall when subjected to increasing external storage pressures, without significantly affecting the internal pressure required to open the component wall 352.

It will be appreciated that while the support feature has been shown in the form of a continuous circular ring or rib, other appropriate forms or shapes can be used to provide the desired effect. For example, support features in the form of non-circular rings as well as non-continuous forms, such as only along specific or particular portions of the outer wall of the component can, as desired be utilized. In general, however, as continuous forms of such support features will generally provide increased support, such forms will typically be preferred.

It will be appreciated that a support feature such as the above-described stiffening ring can typically be formed of the same material, such as metal, plastic or ceramic, used in the fabrication of the specific assembly component but with variation in thickness, as required.

While the invention has been described above relative to the use of a fuel containment assembly housing having an outer side and dome wall which is solid (i.e., free of openings), it is to be understood that the invention, at least in its broader aspects, is not so limited. For example, when the fuel containment assembly includes a capsule wherein the fuel is stored and a housing which at least in part is in surrounding relationship with the capsule, as the housing is not in fluid communication with the fuel in the at rest state for the assembly, the housing can include openings placed or situated as desired to effect performance.

Figure 11:
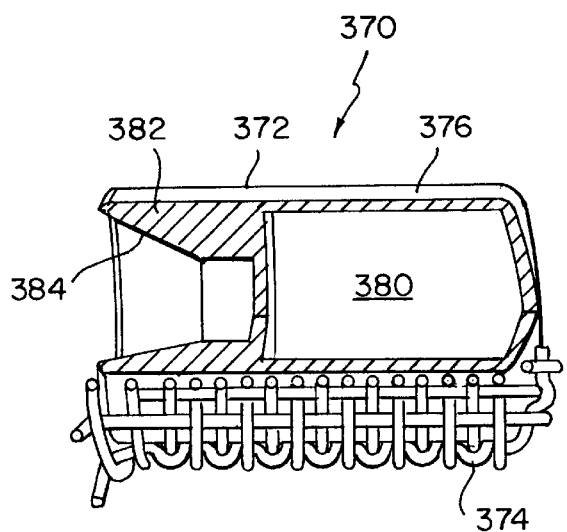
FIG. 11 is a simplified, partially in section, fragmentary schematic drawing of a fuel containment assembly in accordance with one embodiment of the invention wherein a wire screen mesh is used to at least in part to surround a fuel capsule.

FIG. 11 illustrates one such fuel containment assembly 370 in accordance with the invention. Specifically, the fuel containment assembly 370 includes a capsule 372 generally similar to that described above in reference to FIG. 4 and a wire screen mesh housing 374, which serves to appropriately retain the capsule and should the capsule fracture into separate pieces upon actuation of the fuel containment assembly such a housing can serve to retain such formed capsule pieces.

The capsule 372 includes an outer wall 376 which defines an enclosed storage volume 380 therein. The capsule outer wall 376 includes an initiator adjacent second end 382 molded to form a profile 384 adapted to correspond to the associated initiator device (not shown).

The housing 374 is made of metal wire screen mesh, for example, in conjunction with a capsule fabricated of plastic, a 10–24 mesh per square inch wire screen can be used and in conjunction with a capsule fabricated of ceramic, a 24–100 mesh per square inch wire screen can be used.

In practice, such housings will typically be fabricated from steel, aluminum or the like metal wire materials. It will also be appreciated that appropriate alternatives to wire form screen means can be used. For example, rather than screen means formed by metal wires, appropriate screen means can be formed from perforated metal and expanded metal, as desired.

Figure 12:
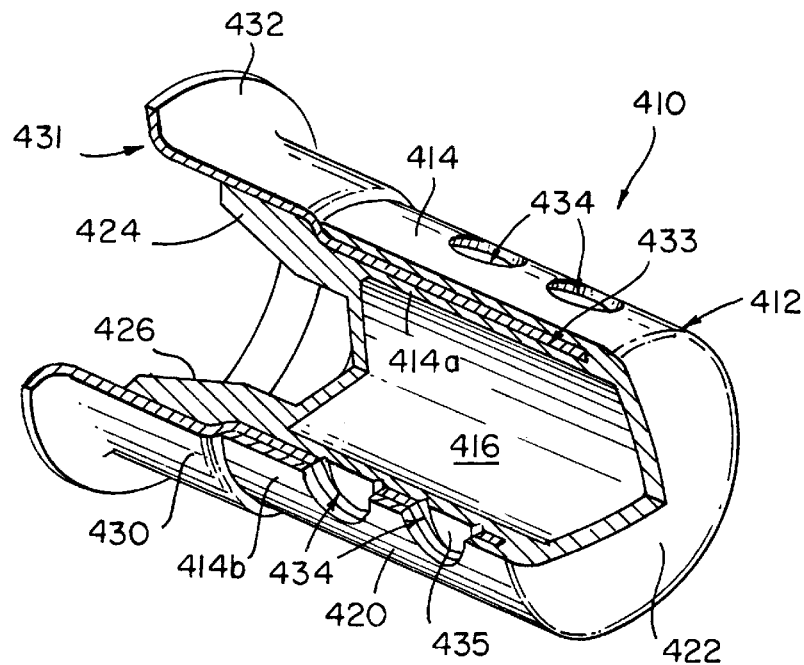
FIG. 12 is a simplified, partially in section perspective schematic drawing of a fuel containment assembly in accordance with yet another alternative embodiment of the invention.
Figure 13:
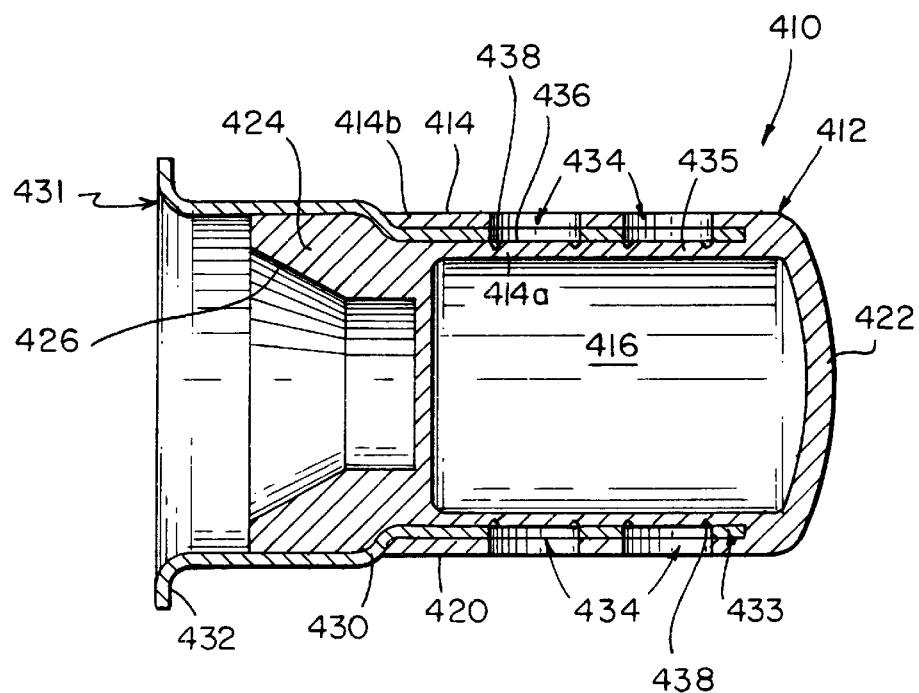
FIG. 13 is a simplified sectional schematic drawing of the fuel containment assembly of FIG. 12.

FIGS. 12 and 13 illustrate a fuel containment assembly 410 in accordance with yet another alternative embodiment of the invention. The assembly 410 includes a capsule 412 of molded material, e.g., plastic, adapted for direct attachment to a corresponding portion of an inflator assembly, for example, the inflator combustion chamber base cap portion 112 shown in FIG. 2.

The capsule 412, similar to the capsule 170' described above, includes an outer wall 414 which defines an enclosed storage volume 416 therein adapted to contain at least a supply of at least one fuel material in the form of a fluid, as described above. Specifically, the outer wall 414 includes a generally cylindrical side 420, a domed first end 422 and an initiator adjacent second end 424 molded to form a profile 426 adapted to correspond to the associated initiator device (not shown).

Molded into the capsule outer wall 414 is a retainer 430 having a first end 431 with an outwardly curled lip 432 and a second end 433 molded into the capsule outer wall 414, between an inner layer 414a and an outer layer 414b. The retainer 430 extends circumferentially about the inner layer 414a and is included to facilitate direct attachment of the capsule in an inflator assembly.

In practice, such retainers will typically be fabricated of metal material, e.g., steel or aluminum, with the metal material stamped and inserted into a mold with, for example, a suitable plastic capsule material molded there around.

The thickness of the retainer as well as the length the retainer extends between the inner and outer layers of the capsule outer wall can be appropriately selected to provide the desired strength to the assembly.

The assembly 410 includes gas flow orifice passageways 434 along the capsule side wall 420, through the outer layer 414b and the retainer 430. The enclosed storage volume 416 is normally blocked from fluid communication with these orifice passageways by means of the inner layer 414a of the capsule outer wall 414. However, at a desired point in time, e.g., upon proper functioning of the initiator device resulting in a pressure increase within the enclosed storage volume 416, the orifice closing portions of the inner layer 414a of the outer wall 414, hereinafter designated 435, will properly fail and permit discharge of the capsule contents.

To facilitate opening of such an assembly at specific predetermined operating conditions, the orifice closing portions 435 of the inner layer 414a can be selectively pre-weakened such as by the inclusion, along the outer surface 436 of the inner layer 414*a*, of areas of reduced wall thickness such as by the scoring of at least a portion of the perimeters of the portions 435. These scores are designated 438.

Figure 14A:
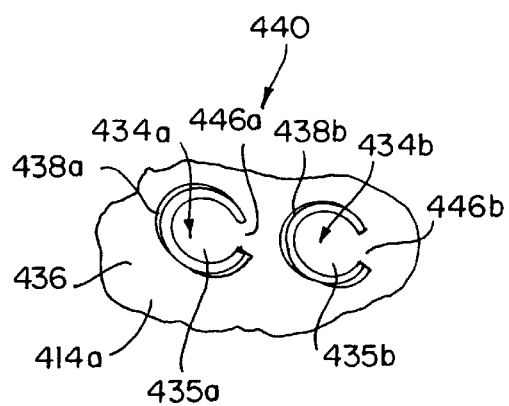
FIG. 14A is a simplified perspective view of a fragmentary portion of the inner layer of the side wall of the fuel containment assembly of FIGS. 12 and 13.
Figure 14B:
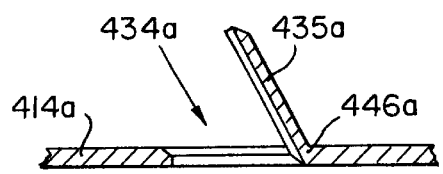
FIG. 14B is a simplified fragmentary cross sectional view showing an open gas flow orifice in the inner layer of the side wall of the fuel containment assembly of FIGS. 12 and 13.

For example, FIG. 14A illustrates a portion 440 of the outer surface 436 of the capsule side wall inner layer 414*a* which includes gas flow orifices, individually designated 434*a* and 434*b*, having corresponding orifice closing portions 435*a* and 435*b*. As shown, the perimeters of the orifice closing portions 435*a* and 435*b* include areas of reduced thickness, designated 438*a* and 438*b*, respectively. These areas of reduced thickness are generally in the form of an incomplete circle and outline the perimeter of the orifice closing portions 435*a* and 435*b*. The circle of reduced thickness is incomplete in that a portion, designated 446*a* and 446*b*, respectively, of the wall layer 414*a* in the path of the circle is of an unreduced thickness and thus serves to retain the corresponding closing portions 435*a* and 435*b* with the balance of the wall layer material upon the opening of the orifice passageways 434*a* and 434*b*, as shown in FIG. 14B for gas flow orifice passageway 434*a*.

In operation, such as upon receipt of an appropriate electrical signal by the associated initiator device, a discharge of energy such as in the form of a hot, particle-laden discharge is directed therefrom to the fuel containment assembly 410, specifically the capsule 412, whereupon the temperature and pressure of the fuel material held within the enclosed storage volume 416 will increase. Upon the exceeding of the structural capability of the capsule wall 414, the capsule 412 will rupture or otherwise open, placing the heated fuel in fluid communication with the combustion chamber and oxidant held therein. Thereafter, operation will generally be similar to that described above.

Figure 15:
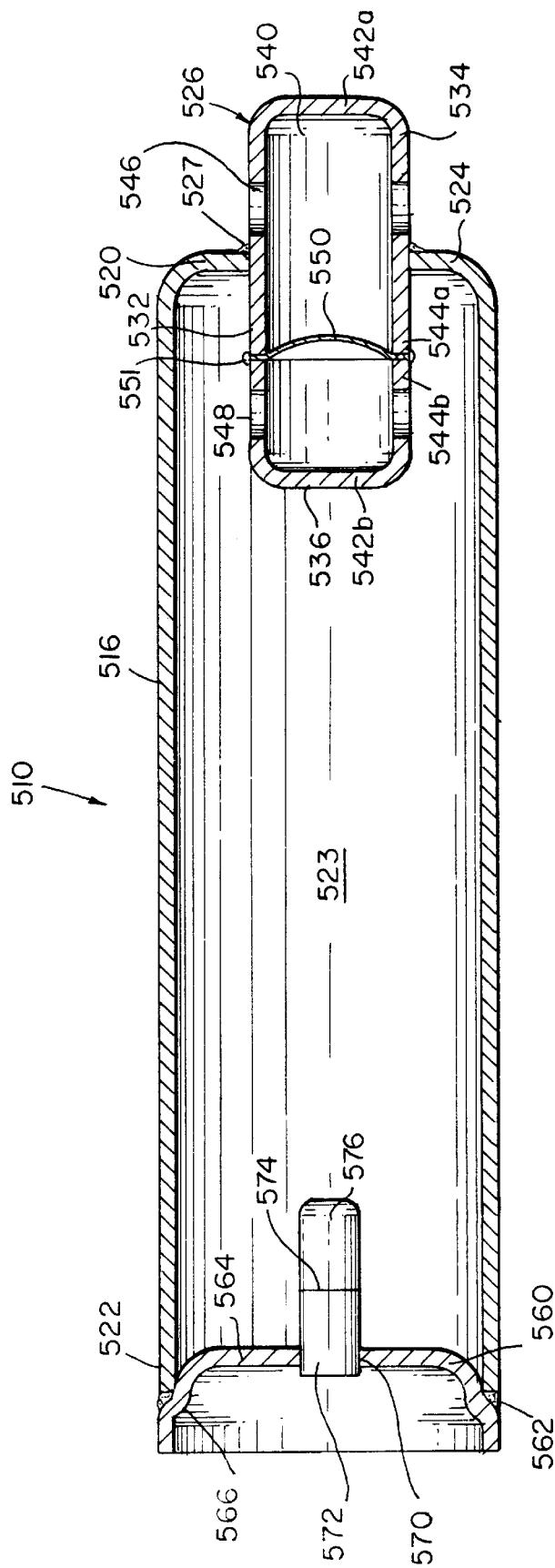
FIG. 15 is a simplified, partially in section schematic drawing of a fluid fueled inflator in accordance with an alternative embodiment of the invention.

FIG. 15 illustrates a fluid fueled inflator assembly 510 in accordance with an alternative embodiment of the invention. The inflator 510 includes an elongated generally cylindrical sleeve 516, having a first and a second end, 520 and 522, respectively, and defines a chamber 523, herein referred to as a combustion chamber.

The first end 520 is partially closed by means of an integral shoulder portion 524. A diffuser assembly 526, such as described above relative to the diffuser assembly 26 of FIG. 1, is attached by a circumferential weld 527 in sealing relation to the sleeve first end 520. As with the diffuser assembly 26, the diffuser assembly 526 includes a generally cylindrical sleeve 532 having a cap portion 534 and a base portion 536 to define a diffuser chamber 540. Each of the diffuser assembly cap and base portions, 534 and 536, respectively, include a closed first end 542*a* and 542*b*, respectively, and an open second end 544*a* and 544*b*, respectively. The diffuser assembly cap portion 534 includes a plurality of openings 546, adjacent the closed cap first end 542*a*, for dispensing inflation gas from the inflator assembly into an airbag assembly (not shown). The diffuser assembly base portion 536 additionally includes a plurality of openings 548, adjacent the closed base first end 542*b*, for passage of inflation gas from the chamber 523, into the diffuser chamber 540.

The diffuser assembly cap and base portions, 534 and 536, respectively, are aligned with the open second end of each, i.e., ends 544*a* and 544*b*, respectively, being closed by sealing means, e.g., by means of a rupture disc 550 abutting thereagainst. The diffuser assembly rupture disc 550 is joined in sealing relation with the diffuser assembly cap and base portions, 534 and 536, respectively, by means of a circumferential weld 551 at the periphery of the disc 550. In the static state, the disc 550 serves to separate the contents of the chamber 523 from the airbag.

An end base 560 is attached by a circumferential weld 562 in sealing relation to the sleeve second end 522. The end base 560 includes a base cap 564 joined thereto via a base shoulder connecting portion 566. The base shoulder connecting portion 566 serves as a convenient means of locating the end base 560 relative to the sleeve 516, as well as providing a location for a circumferential weld 562 whereby the end base 560 is attached in sealing relation to the sleeve 516.

The end base 560 includes an opening 570 therein, wherethrough an initiator device 572 is attached in sealing relation, such as with a weld, crimping or other suitable hermetic seal, within the inflator 510. The initiator device 572 includes a discharge end 574. A fuel containment assembly 576 in accordance with the invention and such as previously described herein is located within the chamber 523, adjacent the initiator device discharge end 574. The fuel containment assembly 576 contains or holds contents which include a quantity of at least one fuel material in the form of fluid.

In operation, such as upon the sensing of a collision, an electrical signal is sent to the initiator device 572, such as a conventional pyrotechnic initiator device. Such an initiator device will upon receipt of an appropriate electrical signal ignite and emit energy, such as in the form of a hot, particle-laden discharge, into the fuel containment assembly 576.

In turn, the temperature and pressure of the fuel stored within the fuel containment assembly 576 will increase. Upon the exceeding of the structural capability of the assembly 576, e.g., at predetermined operating conditions, the assembly will rupture or otherwise open placing the heated fuel in fluid communication with the chamber 523. In the chamber 523, the heated fuel and oxidant (such as normally stored apart from the fuel in the chamber 523 or, as previously described herein, stored together with the fuel material within the fuel containment assembly 576) form a flammable mixture which, via initiation by the initiator, ignites and burns at an elevated temperature and pressure.

The hot gas produced upon the burning of the flammable mixture results in a rapid pressure rise within the chamber 523. When the gas pressure within the chamber 523 exceeds the structural capability of the rupture disc 550, the disc ruptures or otherwise permits the passage of the hot gas through the diffuser assembly 526 and out the openings 546 into the airbag assembly.

It will be appreciated that as such an inflator design does not include a separate storage chamber for the storage of a pressurized gas separate from the fuel and/or oxidant, such an inflator design typically will be composed of fewer parts as compared to the above-described inflator design of FIG. 1. Such reduction in parts and simplified assembly can desirably facilitate and reduce the costs associated with manufacture and assembly as well as reduce the weight of the inflator assembly.

As described above, the pre-weakening of fuel containment assembly components, e.g., either a housing and/or a capsule, such as by selectively reducing the thickness of the outer wall of the component such as by the inclusion of one or more score lines or the like, can minimize or reduce the amount of pressure or force and in turn the amount of energy required to open such a component. Further, allowing the component to preferentially open along a predetermined path such as provided by such a score line results in a more controlled opening and can thus reduce or minimize the potential for undesired fragmentation of the component upon opening.

However, in addition to opening in a controlled manner (e.g. without undesired fragmentation) to allow the fuel and combustion oxidant to properly contact and mix upon initiation, fuel containment assemblies in accordance with the invention generally are required to perform additional various functions including being able to withstand large external pressure loads (e.g., up to 2000 psi or more) without collapsing or buckling.

It will be appreciated that the pre-weakening of fuel containment assembly components can detrimentally impact the external pressure load capacity of the fuel containment assembly component. Specifically, the inclusion of score line grooves or the like which are relatively long and thin, typically can reduce the strength of the fuel containment assembly component by 50% or more, as the buckling strength (e.g. resistance to buckling) of the component is generally a strong function of the wall thickness and, particularly, the score groove length and depth. Alternatively, the utilization of relatively short shallow score line grooves while having a less detrimental impact on the external load capacity of the component, generally can more commonly result in fragmentation of the component upon initiation of the assembly.

In an effort to avoid or overcome at least some of the above-described complications resulting from reducing the thickness of a component outer wall, one aspect of the invention has been the development, as described below, of selectively reducing the component outer wall thickness to multiple depths, what is referred to hereinafter as "multiple depth" grooves or score lines.

Figure 16:
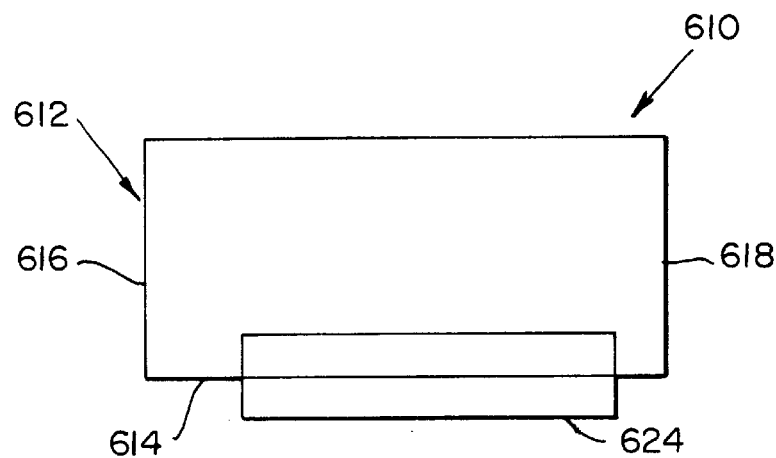
FIG. 16 is a simplified schematic drawing of a fuel containment assembly component in accordance with one embodiment of the invention.

Turning now to FIG. 16, there is illustrated a simplified schematic of a fuel containment assembly component 610, i.e., either a housing or a capsule. Specifically, the component 610, similar to those described above, includes an outer wall 612 having a generally cylindrical side wall portion 614 with a first end portion 616 and a second end portion 618. The cylindrical side wall portion 614 includes a section, designated 624, which as detailed below with reference to FIGS. 17A and 17B, has been pre-weakened, such as by having the thickness of the outer wall 612, specifically along the cylindrical side wall portion 614, selectively reduced by the inclusion of one or more axial score lines.

Figure 17A:
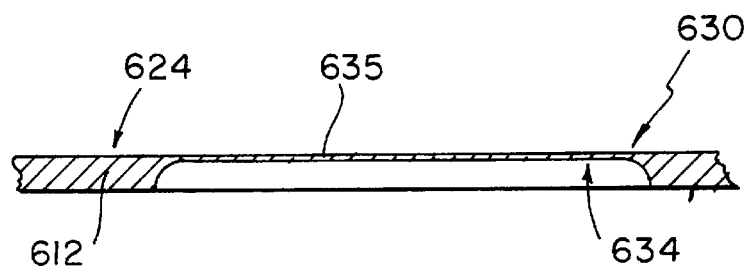
FIGS. 17A and 17B are simplified and enlarged fragmentary drawings of alternative arrangements for a section of the fuel containment assembly component shown in FIG. 16.
Figure 17B:
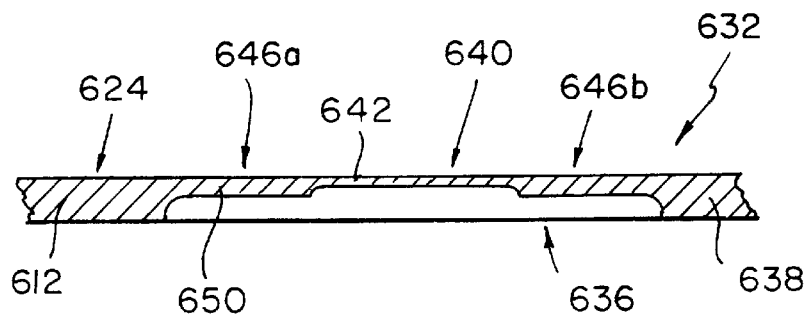

FIGS. 17A and 17B are simplified and enlarged fragmentary drawings illustrating alternative arrangements, designated 630 and 632, respectively, of the cylindrical side wall portion section 624 of FIG. 16 wherein the thickness of the outer wall 612 has been selectively reduced. Specifically, the arrangement 630 of FIG. 17A illustrates a score line 634 of generally constant depth, similar to that previously shown in FIG. 2, for example, and whereat the outer wall 612 has a generally uniform thickness, designated 635, along the length of the score line 634.

The arrangement 632 of FIG. 17B illustrates a multiple depth groove or score line 636 in accordance with one embodiment of the invention. Specifically, while the outer wall 612 has a general thickness designated 638, the score line 636 includes a segment 640, in the general center portion of the cylindrical side wall 614, forming a relatively short and deep groove. At the score line segment 640, the outer wall 612 has a thickness designated 642, which is less than the general thickness 638 of the outer wall 612.

The incorporation of such a short and relatively deep groove generally reduces the amount of energy required to open the component, e.g., a so formed component will generally open at a lower internal pressure.

The score line segment 640 is bordered on both ends by score line segments 646a and 646b whereat the outer wall 612 has a thickness designated 650. The thickness 650 of the outer wall at score line segments 646a and 646b, while greater than the outer wall thickness 642 at the central score line segment 640 is still less than the general thickness 638 of the outer wall 612.

The inclusion of the bordering score line segments 646a and 646b which, as compared to the score line segment 640, are of comparatively greater thickness provide a path along which the opening of the component can propagate thereby resulting in the component opening in a more controlled manner and reduce or minimize the potential for undesired fragmentation of the component upon opening. Additionally, the thicker bordering score line segments provide greater stiffness or resistance to buckling. As a result, the inclusion of such a multiple depth selectively reduced wall thickness in a fuel containment assembly component of the invention minimizes or reduces the amount of pressure or force and in turn the amount of energy required to open such component while still providing sufficient strength to avoid undesired buckling of the component.

While fuel containment assemblies in accordance with the invention have been described above with reference to assemblies containing a housing or a capsule fuel containment assembly component, either alone or together, it will be appreciated that when one of these components is used alone without the other, then the component used would typically be constructed to be able to withstand a larger external pressure as compared to those assemblies including both such components.

For example, a capsule which is used without a fuel containment assembly housing (such as, at least in some circumstances, the capsule 412 shown in FIGS. 12 and 13, for example) would typically be constructed more robustly, e.g., with a thicker outer wall, as compared to a capsule (such as the capsule 170 shown in FIG. 3) situated within a housing (such as the housing 152 shown in FIG. 3) which housing would typically carry at least a portion if not substantially all of the external pressure applied to the assembly. It will be appreciated, however, that in at least some applications including both a housing and a capsule component, it may be desirable to rely on such an underlying structure as the capsule to carry at least some of the external pressure load. In such an instance, the housing wall thickness can be appropriately reduced or minimized.

As described-above, the fuel containment assemblies of the invention are generally designed or adapted to rupture or open at predetermined operating conditions. In general, such fuel containment assembly design can represent a balancing of various factors including the general desire for rapid release of the stored fuel and the ability of the assembly to withstand higher or relatively greater external loads.

More specifically, as the inflation of automotive airbags must meet very stringent performance criteria, in practice it will be appreciated that in certain applications utilizing the fluid fuel materials of the invention in the fuel containment assemblies of the invention it may be advantageous and desirable for the fuel containment assembly to open or release the stored fuel as quickly as reasonably possible. Such quick opening of the fuel containment assembly will permit the rapid release, vaporization and combustion of the released fuel and may be particularly desirable for those assemblies containing relatively heavier fuels, e.g., fuel materials of higher molecular weight, viscosity, surface tension and/or heat of vaporization, for example.

The external load on the fuel containment assemblies of the invention are generally a result of the elevated pressures normally present in the combustion chamber. In practice, the fuel containment assemblies of the invention will be designed to safely withstand a high external load without failure or rupture.

It is also to be appreciated that improved safety can be realized through the use of a pre-filled fuel-containing assembly component in accordance with the invention.

For example, as allowed with at least some of the above-described embodiments, the appropriately selected assembly component can be filled with fuel at a location remote from the site of the balance of the inflator production or assembly. Thus, in one embodiment, a capsule can be appropriately filled with fuel at a location remote from the location at which the inflator is appropriately filled to contain a pressurized oxidizing gas, for example. As a result, the potential for a possible fire or explosion from the undesired contact of the fuel and oxidant can be significantly reduced if not eliminated. Such a safety development can be especially significant in a high assembly rate environment such as associated with the mass production of vehicular restraint system airbag inflators.

Additionally, such a fuel-containing component can be checked for the undesired leakage of fuel prior to installation of the component into the inflator housing, with the appropriate rejection of any unacceptable components. Then, following installation of an appropriately checked component, the assembled inflator can in appropriate situations itself be leak checked. Such a leak check process can better ensure the quality of installed inflator assemblies.

In view of the above, the invention provides an inflator assembly which utilizes a fuel in the form of a fluid that is burned to produce inflation gas and which assembly appropriately moderates the impact of operation at varying ambient temperature conditions. Further, the invention provides such an inflator assembly having improved moderation or control of the rate at which the fuel is introduced into the combustion chamber and, in turn, improved moderation or control of the rate of reaction of such fuel.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art. Consistent therewith, appearances of mean-plus-function clauses in the claims are intended to cover not only structural equivalents but also equivalent structures. For example, although a nail and a screw may not be considered equivalent structures in that a nail employs a cylindrical surface to secure parts together, whereas a screw employs a helical surface, in the environment of part fastening, a nail and a screw may be equivalent structures.

What is claimed is:

1. An apparatus for inflating an inflatable device, said apparatus comprising:
    a closed first chamber wherein at least one fuel in the form of a fluid is burned to produce combustion products, with said first chamber openable at predetermined conditions to permit release of the combustion products;
    a fuel containment assembly including a capsule having a unitary fixed outer wall defining an enclosed storage volume, with the storage volume containing at least a supply of the at least one fuel in the form of a fluid prior to installation of the capsule in the apparatus, with the capsule adapted to open at predetermined operating conditions to be in fluid communication with said first chamber; and
    an initiator to initiate burning of the at least one fuel in said first chamber.

2. The apparatus of claim 1 wherein the at least one fuel comprises a fluid in the form of a gas, liquid, finely divided solid or a combination thereof.

3. The apparatus of claim 1 wherein the at least one fuel comprises a fluid in the form of a gas.

4. The apparatus of claim 1 wherein the at least one fuel comprises a fluid in the form of a liquid.

5. The apparatus of claim 1 wherein the at least one fuel comprises a fluid in the form of a finely divided solid.

6. The apparatus of claim 1 wherein the at least one fuel is stored free of combustion oxidant within said fuel containment assembly.

7. The apparatus of claim 1 wherein the at least one fuel and an oxidant are stored together within said fuel containment assembly as a single material.

8. The apparatus of claim 7 wherein the single material comprises a hydroxyl ammonium nitrate-based liquid monopropellant.

9. The apparatus of claim 1 wherein the capsule is formed from plastic.

10. The apparatus of claim 1 wherein the first chamber contains an oxidizing environment and the capsule is fabricated of a material at least in part consumable in the oxidizing environment of the first chamber.

11. The apparatus of claim 1 wherein the outer wall of the capsule is shaped to form a profile adapted to correspond to the external shape of said initiator.

12. The apparatus of claim 1 wherein the capsule includes integral therewith a retainer adapted to permit direct attachment of the capsule within the apparatus.

13. The apparatus of claim 1 wherein the capsule has been pre-weakened by selectively reducing the thickness of the outer wall.

14. The apparatus of claim 13 wherein said selective reduction in the thickness of the capsule outer wall comprises at least one axially extending score.

15. The apparatus of claim 13 wherein said selective reduction in the thickness of the capsule outer wall comprises at least one radially extending score.

16. The apparatus of claim 13 wherein said selective reduction in the thickness of the capsule outer wall comprises at least one cylindrical helix axially extending score.

17. The apparatus of claim 13 wherein said selective reduction in the thickness of the capsule outer wall comprises at least one non-continuous score.

18. The apparatus of claim 13 wherein said selective reduction in the thickness of the capsule outer wall comprises at least one multiple depth score.

19. The apparatus of claim 1 wherein the capsule includes at least one stiffening feature.

20. The apparatus of claim 19 wherein the capsule outer wall has an inner surface and the stiffening feature comprises a ring adjacent the inner surface of the capsule outer wall.

21. The apparatus of claim 1 wherein said fuel containment assembly is adapted to moderate the rate of introduction of the fuel into the first chamber dependent on selected design parameters including sizing of said initiator, fracturability of the capsule and selection, amount and fill fraction of the fuel.

22. The apparatus of claim 1 wherein said fuel containment assembly is adapted to self-compensate for the influence of ambient temperature.

23. The apparatus of claim 1 wherein the capsule outer wall has an external surface and said fuel containment assembly additionally comprises a housing adjacent at least a portion of the capsule outer wall external surface.

24. The apparatus of claim 23 wherein said housing is fabricated of metal.

25. The apparatus of claim 23 wherein said housing is fabricated of a material impervious to the at least one fuel.

26. The apparatus of claim 23 wherein said housing comprises a screen material.

27. The apparatus of claim 23 wherein said housing comprises an outer wall and the housing outer wall has been pre-weakened by selectively reducing the thickness of the housing outer wall.

28. An apparatus for inflating an inflatable device, said apparatus comprising:
 a closed first chamber wherein at least one fuel in the form of a fluid is burned to produce combustion products, said first chamber openable at predetermined conditions to permit release of the combustion products; and
 a fuel containment assembly including:
  a closed housing having an outer wall and containing, free of combustion oxidant, a supply of the at least one fuel in the form of a fluid with the outer wall impervious to the at least one fuel, with the housing adapted to open at predetermined operating conditions to be in fluid communication with said first chamber;
  the assembly also having, along a second wall of the housing, an initiator to initiate burning of the at least one fuel in said first chamber.

29. The apparatus of claim 28 wherein the at least one fuel comprises a fluid in the form of a gas, liquid, finely divided solid or a combination thereof.

30. The apparatus of claim 28 wherein the at least one fuel comprises a fluid in the form of a gas.

31. The apparatus of claim 28 wherein the at least one fuel comprises a fluid in the form of a liquid.

32. The apparatus of claim 28 wherein the at least one fuel comprises a fluid in the form of a finely divided solid.

33. The apparatus of claim 28 wherein the housing is formed from metal.

34. The apparatus of claim 28 wherein the housing has been pre-weakened by selectively reducing the thickness of the outer wall.

35. The apparatus of claim 34 wherein said selective reduction in the thickness of the housing outer wall comprises at least one axially extending score.

36. The apparatus of claim 34 wherein said selective reduction in the thickness of the housing outer wall comprises at least one radially extending score.

37. The apparatus of claim 34 wherein said selective reduction in the thickness of the housing outer wall comprises at least one cylindrical helix axially extending score.

38. The apparatus of claim 34 wherein said selective reduction in the thickness of the housing outer wall comprises at least one non-continuous score.

39. The apparatus of claim 34 wherein said selective reduction in the thickness of the housing outer wall comprises at least one multiple depth score.

40. The apparatus of claim 28 wherein the housing includes at least one stiffening feature.

41. The apparatus of claim 40 wherein the housing outer wall has an inner surface and the stiffening feature comprises a ring adjacent the inner surface of the housing outer wall and adapted to increase the external load capacity of the housing.

42. The apparatus of claim 28 wherein said fuel containment assembly is adapted to moderate the rate of introduction of the fuel into the first chamber dependent on selected design parameters including sizing of said initiator, fracturability of the housing and selection, amount and fill fraction of the fuel.

43. The apparatus of claim 28 wherein said fuel containment assembly is adapted to self-compensate for the influence of ambient temperature.

44. An apparatus for inflating an inflatable device, said apparatus comprising:
 a closed fuel containment assembly including a capsule having a unitary fixed outer wall and defining an enclosed storage volume, with the storage volume containing, prior to installation of the capsule in the apparatus, contents including at least a supply of at least one fuel in the form of a fluid, with said fuel containment assembly adapted to open at predetermined operating conditions;
 a first chamber in fluid communication with at least a portion of the supply of the at least one fuel from the capsule upon opening of said fuel containment assembly, wherein the at least one fuel is burned to produce combustion products including hot combustion gas, the combustion of the at least one fuel increasing the temperature and pressure within said first chamber with said first chamber adapted to open when a predetermined increase in pressure within said first chamber is realized, whereby at least a portion of the hot combustion gas is expelled from said first chamber;
 a second chamber containing a supply of pressurized stored gas, said second chamber in fluid communication with said first chamber upon the opening of said first chamber with the hot combustion gas expelled from said first chamber mixing with the pressurized stored gas to produce inflation gas, said second chamber adapted to open when a predetermined increase in pressure within said second chamber is realized after the hot combustion gas expelled from said first chamber mixes with the pressurized stored gas to produce the inflation gas, whereby at least a portion of the inflation gas is expelled from said second chamber to inflate the device; and
 an initiator to initiate burning of at least a portion of the at least one fuel in said first chamber.

45. The apparatus of claim 44 wherein the at least one fuel is stored free of combustion oxidant within said fuel containment assembly.

46. The apparatus of claim 43 wherein the at least one fuel and an oxidant are stored together within said fuel containment assembly as a single material.

47. The apparatus of claim 46 wherein the single material comprises a hydroxyl ammonium nitrate-based liquid monopropellant.

48. The apparatus of claim 43 wherein the capsule has been pre-weakened by selectively reducing the thickness of the outer wall.

49. The apparatus of claim 48 wherein said selective reduction in the thickness of the capsule outer wall comprises at least one multiple depth score.

50. The apparatus of claim 44 wherein said fuel containment assembly is adapted to moderate the rate of introduction of the fuel into the first chamber dependent on selected design parameters including sizing of said initiator, fracturability of the capsule and selection, amount and fill fraction of the fuel.

51. The apparatus of claim 44 wherein said fuel containment assembly is adapted to self-compensate for the influence of ambient temperature.

52. The apparatus of claim 44 wherein the capsule outer wall has an external surface and said fuel containment assembly additionally comprises a housing adjacent at least a portion of the capsule outer wall external surface.

53. The apparatus of claim 52 wherein the housing comprises a screen material.

54. The apparatus of claim 52 wherein the housing comprises an outer wall and wherein the housing outer wall has been pre-weakened by selectively reducing the thickness of the housing outer wall.

55. An apparatus for inflating an inflatable device, said apparatus comprising:
- a fuel containment assembly including a closed housing having an outer wall and containing, free of combustion oxidant, contents including a supply of at least one fuel in the form of a fluid, the outer wall being impervious to the at least one fuel, with the housing outer wall adapted to open at predetermined operating conditions;
- a first chamber in fluid communication with said fuel containment assembly upon opening of the housing outer wall, wherein at least a portion of the supply of the at least one fuel is burned to produce combustion products including hot combustion gas, the combustion of the at least one fuel increasing the temperature and pressure within said first chamber with said first chamber adapted to open when a predetermined increase in pressure within said first chamber is realized, whereby at least a portion of the hot combustion gas is expelled from said first chamber;
- a second chamber containing a supply of pressurized stored gas, said second chamber in fluid communication with said first chamber upon the opening of said first chamber with the hot combustion gas expelled from said first chamber mixing with the pressurized stored gas to produce inflation gas, said second chamber adapted to open when a predetermined increase in pressure within said second chamber is realized after the hot combustion gas expelled from said first chamber mixes with the pressurized stored gas to produce the inflation gas, whereby at least a portion of the inflation gas is expelled from said second chamber to inflate the device; and
- an initiator to initiate the burning of the at least one fuel in said first chamber.

56. The apparatus of claim 55 wherein the housing has been pre-weakened by selectively reducing the thickness of the outer wall.

57. The apparatus of claim 56 wherein said selective reduction in the thickness of the housing outer wall comprises at least one multiple depth score.

58. The apparatus of claim 55 wherein said fuel containment assembly is adapted to moderate the rate of introduction of the fuel into the first chamber dependent on selected design parameters including sizing of said initiator, fracturability of the housing and selection, amount and fill fraction of the fuel.

59. The apparatus of claim 55 wherein said fuel containment assembly is adapted to self-compensate for the influence of ambient temperature.

60. A method for inflating an inflatable safety device in a vehicle using an inflation apparatus, said method comprising the steps of:
opening at least one of:
- a) a closed capsule having a unitary fixed outer wall defining an enclosed storage volume containing, prior to installation in the apparatus, at least a supply of at least one fuel in the form of a fluid, and
- b) a closed fuel housing of a fuel containment assembly, the housing containing, free of combustion oxidant, at least a supply of at least one fuel in the form of a fluid prior to said opening, with said opening resulting in a release of at least a portion of the supply of the at least one fuel into a first sealed chamber;

burning the released portion of the supply of the at least one fuel in the first sealed chamber to produce combustion products including hot combustion gas; and releasing inflation gas comprising at least a portion of the combustion gas from the apparatus to inflate the inflatable safety device.

61. The method of claim 60 wherein prior to the release of the inflation gas, said method additionally comprises the step of:

mixing at least a portion of the hot combustion gas from the first chamber with a pressurized stored gas in a second chamber to produce the inflation gas.

62. The method of claim 61 wherein the first sealed chamber includes at least one gas exit opening normally closed by a sealing means, said burning increasing the temperature and pressure within the first chamber, with the first chamber sealing means opening when a predetermined increase in pressure within the first chamber is realized to expel the hot combustion gas from the first chamber into the second chamber, and wherein the second chamber includes at least one gas exit port normally closed by a sealing means, said mixing increasing the temperature and pressure within the second chamber, with the second chamber port sealing means opening after the hot combustion gas expelled from the first chamber has mixed with the pressurized stored gas to produce the inflation gas and when a predetermined increase in pressure within the second chamber is realized, to expel the inflation gas from the second chamber to inflate the inflatable safety device.

63. The method of claim 60 wherein:
- a) when opening the closed capsule, said opening comprises rupturing an outer wall of the closed capsule and
- b) when opening the closed fuel housing, said opening comprises rupturing an outer wall of the closed fuel housing.

64. The method of claim 60 wherein the degree to which either the capsule or the housing, respectively, opens and the rate at which the fuel is released into the sealed first chamber is dependent on the ambient temperature at which the method is conducted.

65. A method of manufacturing an apparatus for inflating an inflatable device, said method comprising the steps of:
at least partially filling an enclosed storage volume in a capsule with a supply of least one fuel in the form of a fluid, the enclosed storage volume defined by a unitary fixed outer wall of the capsule and loading the fuel-containing capsule into an apparatus subcombination including;
- a closed first chamber in fluid communication with the fuel-containing capsule upon opening of the capsule, wherein the at least one fuel is burned to produce combustion products, the first chamber openable at predetermined conditions to permit release of the combustion products, and
- an initiator to initiate burning in said first chamber of at least a portion of the supply of the at least one fuel.

* * * * *